United States Patent
Murayama et al.

(10) Patent No.: US 10,202,948 B2
(45) Date of Patent: Feb. 12, 2019

(54) STRADDLED VEHICLE

(71) Applicant: YAMAHA HATSUDOKI KABUSHIKI KAISHA, Iwata-shi, Shizuoka-ken (JP)

(72) Inventors: Yuki Murayama, Iwata (JP); Takehiro Shimizu, Iwata (JP); Kazuhiko Isayama, Iwata (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 0 days.

(21) Appl. No.: 15/677,173

(22) Filed: Aug. 15, 2017

(65) Prior Publication Data

US 2018/0149123 A1 May 31, 2018

(30) Foreign Application Priority Data

Nov. 28, 2016 (JP) ................................. 2016-230670

(51) Int. Cl.
| | |
|---|---|
| *F02M 35/00* | (2006.01) |
| *F02M 35/14* | (2006.01) |
| *F02M 35/10* | (2006.01) |
| *F02M 35/04* | (2006.01) |
| *F02M 35/16* | (2006.01) |

(52) U.S. Cl.
CPC .......... *F02M 35/14* (2013.01); *F02M 35/046* (2013.01); *F02M 35/10085* (2013.01); *F02M 35/10262* (2013.01); *F02M 35/162* (2013.01)

(58) Field of Classification Search
CPC ............. F02M 35/14; F02M 35/10085; F02M 35/046; F02M 35/10262; F02M 35/162
See application file for complete search history.

(56) References Cited

U.S. PATENT DOCUMENTS

| | | | | | |
|---|---|---|---|---|---|
| 4,793,293 | A | * | 12/1988 | Minami ................. | B60K 11/08 123/41.61 |
| 5,301,767 | A | * | 4/1994 | Shiohara ................ | B60K 13/06 180/219 |
| 6,251,151 | B1 | * | 6/2001 | Kobayashi .............. | F02B 61/02 123/198 E |
| 6,409,783 | B1 | * | 6/2002 | Miyajima .............. | F02M 35/04 123/198 E |
| 7,264,072 | B2 | * | 9/2007 | Yoshikawa ............ | F02M 35/04 123/184.21 |
| 7,331,322 | B2 | * | 2/2008 | Seki ................. | F02M 35/10013 123/184.21 |
| 7,357,205 | B2 | * | 4/2008 | Nishizawa ........... | F02M 35/022 123/41.56 |

(Continued)

FOREIGN PATENT DOCUMENTS

| | | |
|---|---|---|
| JP | 2009-202827 A | 9/2009 |
| JP | 2010-030584 A | 2/2010 |

*Primary Examiner* — Jacob B Meyer
(74) *Attorney, Agent, or Firm* — Rabin & Berdo, P.C.

(57) ABSTRACT

A straddled vehicle includes a duct part formed integrally with a lower case of an air cleaner and extending forward from the lower case in a vehicle front-rear direction, and a side cover including a duct formation portion placed outward of the duct part in a vehicle width direction. At least a portion of the side cover is assembled onto the duct part. A duct is defined by the duct part and the duct formation portion of the side cover.

10 Claims, 16 Drawing Sheets

(56) References Cited

U.S. PATENT DOCUMENTS

| | | | | |
|---|---|---|---|---|
| 7,380,624 B2* | 6/2008 | Momosaki | F02M 35/10013 | 180/68.3 |
| 7,527,115 B2* | 5/2009 | Tsuya | B62K 11/04 | 123/41.6 |
| 7,556,115 B2* | 7/2009 | Iwanaga | B62J 99/00 | 180/219 |
| 7,686,116 B2* | 3/2010 | Oohashi | B62K 11/04 | 180/219 |
| 7,690,689 B2* | 4/2010 | Muroo | B62J 35/00 | 280/833 |
| 8,061,468 B2* | 11/2011 | Miyashiro | B62K 11/04 | 180/296 |
| 8,146,693 B2* | 4/2012 | Oohashi | B60K 13/02 | 180/68.3 |
| 8,181,729 B2* | 5/2012 | Hiramatsu | B62M 7/02 | 180/68.1 |
| 8,662,518 B2* | 3/2014 | Koike | B62J 35/00 | 280/288.4 |
| 8,851,220 B2* | 10/2014 | Abe | B01D 46/0005 | 180/68.1 |
| 8,967,314 B2* | 3/2015 | Murayama | B62K 11/04 | 180/292 |
| 8,991,533 B2* | 3/2015 | Abe | F02M 35/0203 | 180/218 |
| 9,097,223 B2* | 8/2015 | Kawata | F02M 35/162 | |
| 9,120,524 B2* | 9/2015 | Ozaki | B62K 11/04 | |
| 9,156,513 B2* | 10/2015 | Imai | B62J 17/02 | |
| 9,267,469 B2* | 2/2016 | Ide | B60K 13/02 | |
| 9,296,445 B2* | 3/2016 | Kontani | B62K 11/04 | |
| 9,328,703 B2* | 5/2016 | Shimozato | F02M 35/162 | |
| 9,587,600 B2* | 3/2017 | Tsubone | B62K 11/04 | |
| 9,669,704 B2* | 6/2017 | Nakayama | B62J 17/00 | |
| 9,714,631 B2* | 7/2017 | Koyama | F02M 35/162 | |
| 9,988,121 B2* | 6/2018 | Inomata | B62J 37/00 | |
| 2004/0060545 A1* | 4/2004 | Kurayoshi | F02B 61/02 | 123/472 |
| 2005/0051375 A1* | 3/2005 | Momosaki | F02M 35/10013 | 180/219 |
| 2006/0006016 A1* | 1/2006 | Nishizawa | F02M 35/022 | 180/219 |
| 2006/0254844 A1* | 11/2006 | Nakashima | B62J 17/00 | 180/229 |
| 2007/0144802 A1* | 6/2007 | Tsuya | B62K 11/04 | 180/68.2 |
| 2007/0193804 A1* | 8/2007 | Yokoi | F02B 27/0231 | 180/219 |
| 2008/0110687 A1* | 5/2008 | Miyashiro | B62K 11/04 | 180/296 |
| 2008/0121453 A1* | 5/2008 | Koike | B62J 35/00 | 180/219 |
| 2008/0184954 A1* | 8/2008 | Yokoi | F02M 35/10032 | 123/184.53 |
| 2008/0184961 A1* | 8/2008 | Miyashiro | F01N 13/20 | 123/445 |
| 2008/0289893 A1* | 11/2008 | Iwanaga | B62J 99/00 | 180/229 |
| 2009/0090090 A1* | 4/2009 | Nishizawa | B01D 46/0005 | 55/290 |
| 2009/0090576 A1* | 4/2009 | Nishizawa | B62K 11/04 | 180/219 |
| 2009/0166121 A1* | 7/2009 | Hiramatsu | B62K 11/04 | 180/291 |
| 2009/0218152 A1* | 9/2009 | Oohashi | B60K 13/02 | 180/68.3 |
| 2009/0322069 A1* | 12/2009 | Koike | B62J 35/00 | 280/835 |
| 2014/0262571 A1* | 9/2014 | Murayama | B62K 11/04 | 180/68.3 |
| 2014/0262572 A1* | 9/2014 | Ide | B60K 13/02 | 180/68.3 |
| 2015/0101558 A1* | 4/2015 | Shimozato | F02M 35/162 | 123/184.21 |
| 2017/0254300 A1* | 9/2017 | Abe | B62J 17/02 | |
| 2018/0149123 A1* | 5/2018 | Murayama | F02M 35/14 | |

* cited by examiner

STRADDLED VEHICLE

CROSS-REFERENCE TO RELATED APPLICATIONS

This application claims the benefit of priority to Japanese Patent Application No. 2016-230670 filed on Nov. 28, 2016. The entire contents of this application are hereby incorporated herein by reference.

BACKGROUND OF THE INVENTION

Field of the Invention

The present invention relates to a straddled vehicle.

Description of the Related Art

A motorcycle has been known in the art including a duct that guides the ambient air into the air cleaner and whose external wall serves as the side cover, as disclosed in Japanese Laid-Open Patent Publication No. 2010-30584 and Japanese Laid-Open Patent Publication No. 2009-202827, for example.

Motorcycles described in Japanese Laid-Open Patent Publication No. 2010-30584 and Japanese Laid-Open Patent Publication No. 2009-202827 include a left duct placed leftward of the vehicle center line and a right duct placed rightward of the vehicle center line. The case of the air cleaner is placed rightward of the left duct and leftward of the right duct. An air cleaner element is accommodated inside the case. The left duct and the right duct are formed separately from the case, and are assembled onto the case. The left external wall of the left duct and the right external wall of the right duct each serve as the side cover. The air having been guided in through the air inlet of each duct passes through the inside of the duct to be guided into the case. The air having been guided into the case is cleaned while passing through the air cleaner element, and is then supplied into the engine.

In the motorcycle described above, a portion of the left side cover is placed below the left duct. The left duct and the portion of the left side cover are arranged next to each other in the up-down direction. A portion of the right side cover is placed below the right duct. The right duct and the portion of the right side cover are arranged next to each other in the up-down direction. The left duct and the left side cover are formed separately from each other, and the right duct and the right side cover are formed separately from each other.

With the motorcycle described above, the case of the air cleaner, the left duct, the right duct, the left side cover and the right side cover were separate from one another, resulting in a large number of parts. This also required a structure for fastening them together, and the operation of fastening them together was troublesome. This led to an increase in the cost or the weight. The left duct and the right duct tended to be large, and there was room for improvement in making knee gripping easier.

SUMMARY OF THE INVENTION

It is an object of the present invention, which has been made in order to solve the problem, to provide a straddled vehicle including a duct that guides the air into the air cleaner, with a part of the external wall of the duct serving as the side cover, wherein the number of parts is reduced and knee gripping is made easy.

A straddled vehicle according to the present invention includes a vehicle body frame, a radiator, an air cleaner, a duct part, and a side cover. The vehicle body frame includes a head pipe and a down frame extending downward from the head pipe. The radiator is supported on the down frame and placed below the head pipe. The air cleaner is placed rearward of the head pipe in a vehicle front-rear direction, the air cleaner including an upper case, a lower case placed below the upper case, and an air cleaner element provided between the upper case and the lower case. The duct part is formed integrally with the lower case and extending forward in the vehicle front-rear direction from the lower case. The side cover includes a duct formation portion placed outward of the duct part in a vehicle width direction and a radiator cover portion placed outward of the radiator in the vehicle width direction, wherein at least a portion of the side cover is assembled onto the duct part. A duct connected to an internal space between the upper case and the air cleaner element in the air cleaner is defined by the duct part and the duct formation portion of the side cover.

With the straddled vehicle set forth above, the duct part forming a part of the duct is formed integrally with the lower case of the air cleaner. Moreover, the duct formation portion being a part of the side cover forms another part of the duct. Therefore, the number of parts can be reduced. There is no need for a structure used for fastening together the lower case of the air cleaner and the duct or a structure used for fastening together the side cover and the duct, and there is no need for the operation of fastening them together. Since there is no need to have the side cover and the duct laid over each other in the vehicle width direction, it is possible to prevent the side cover and the duct from becoming large in the vehicle width direction. This makes knee gripping easier.

According to a preferred embodiment of the present invention, the duct part includes an upper edge extending in the vehicle front-rear direction, a lower edge extending in the vehicle front-rear direction and located below the upper edge, and an inner wall located between the upper edge and the lower edge and depressed inward in the vehicle width direction.

According to the embodiment set forth above, it is possible to form a desirable duct by a duct part being integral with the lower case.

According to another preferred embodiment of the present invention, an upper portion of the duct part and an upper portion of the duct formation portion of the side cover are laid on each other in an up-down direction; and a lower portion of the duct part and a lower portion of the duct formation portion of the side cover are laid on each other in the up-down direction.

As described above, the duct is formed by the duct part and the duct formation portion of the side cover. According to the embodiment set forth above, however, the upper portions thereof and the lower portions thereof are laid on each other in the up-down direction. Therefore, it is possible to more reliably prevent the air from leaking out of the duct while avoiding the duct becoming large in the vehicle width direction.

According to another preferred embodiment of the present invention, the lower edge of the duct part is located outward of the upper edge of the duct part in the vehicle width direction.

According to the embodiment set forth above, since the duct part is configured as described above, it is possible to realize a desirable side cover that can be assembled onto the duct part, thus forming a desirable duct, and that makes knee gripping easy.

According to another preferred embodiment of the present invention, the straddled vehicle includes a fuel tank placed rearward of the air cleaner in the vehicle front-rear direction. The side cover includes a tank cover portion placed outward of the fuel tank in the vehicle width direction.

According to the embodiment set forth above, there is no need, beside the side cover, for other covers that cover the side of the fuel tank. Thus, it is possible to further reduce the number of parts and to further save the fastening operation.

According to another preferred embodiment of the present invention, the tank cover portion of the side cover and the fuel tank are fastened together via a fastener.

According to the embodiment set forth above, the tank cover portion is fastened to the fuel tank, thereby stably supporting the side cover. It is possible to increase the rigidity of the side cover.

According to another preferred embodiment of the present invention, the straddled vehicle includes an engine unit placed rearward of and below the head pipe; and an intake pipe placed below the air cleaner and connecting together the air cleaner and the engine unit. The side cover includes a portion that is placed outward of at least a portion of the intake pipe in the vehicle width direction.

According to the embodiment set forth above, there is no need, beside the side cover, for other covers that cover the side of at least one portion of the intake pipe. Thus, it is possible to further reduce the number of parts and to further save the fastening operation.

According to another preferred embodiment of the present invention, the side cover, the duct part and the radiator are fastened together via a fastener.

According to the embodiment set forth above, the side cover, the duct part and the radiator are fastened together via the same fastener, and it is therefore possible to reduce the number of parts to be fastened together and to save the fastening operation.

According to another preferred embodiment of the present invention, a portion of the side cover and a portion of the lower case are laid on each other in the up-down direction and are fastened together via a fastener.

According to the embodiment set forth above, the side cover can be desirably assembled onto the lower case.

According to the present invention, it is possible to provide a straddled vehicle including a duct that guides the air into the air cleaner, with a part of the external wall of the duct serving as the side cover, wherein the number of parts is reduced and knee gripping is made easy.

DETAILED DESCRIPTION OF THE PREFERRED EMBODIMENTS

Figure 1:
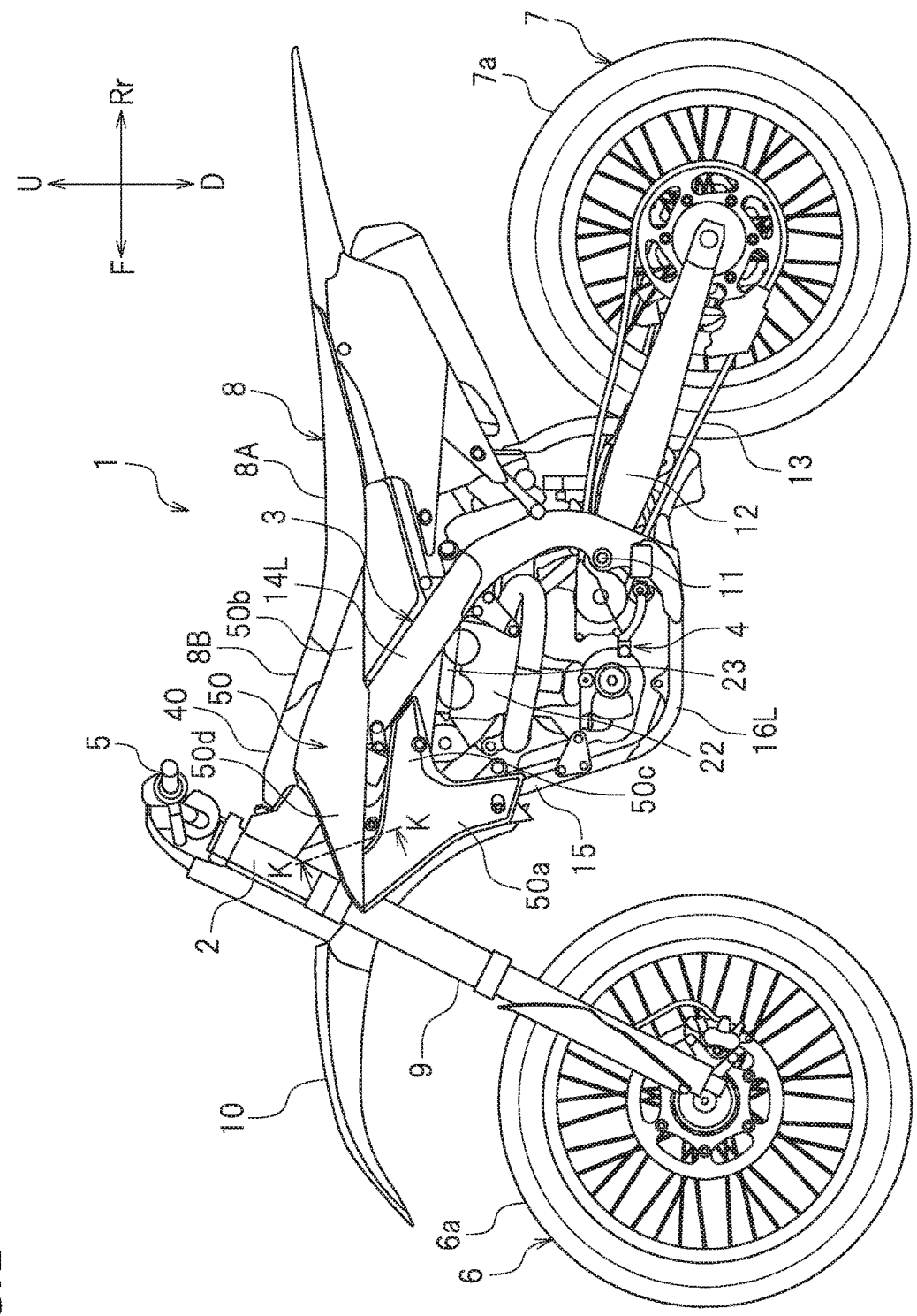
FIG. 1 is a side view of a motorcycle according to one embodiment.

An embodiment of the present invention will now be described with reference to the drawings. FIG. 1 is a side view of a motorcycle 1 according to the embodiment. The motorcycle 1 includes a vehicle body frame 3 including a head pipe 2, an engine unit 4, a handle 5, a front wheel 6, a rear wheel 7, and a seat 8 on which the rider is seated.

The terms front, rear, left, right, up and down, as used in the description below, refer to these directions as seen from the rider while assuming that the motorcycle 1 is standing upright on a horizontal surface with no load thereon. Note that "no load" means that there is no rider on the motorcycle 1 and the motorcycle 1 has no fuel. The designations F, Rr, L, R, U and D, as used in the figures, refer to front, rear, left, right, up and down, respectively.

The term "front" is not limited to the horizontal forward direction, but is inclusive of any inclined direction that is in the range of −45° to +45° with respect to the horizontal forward direction, unless specified otherwise. Similarly, the term "rear" is not limited to the horizontal rearward direction, but is inclusive of any inclined direction that is in the range of −45° to +45° with respect to the horizontal rearward direction. The term "left" is not limited to the leftward direction in the vehicle width direction, but is inclusive of any inclined direction that is in the range of −45° to +45° with respect to that direction. The term "right" is not limited to the rightward direction in the vehicle width direction, but is inclusive of any inclined direction that is in the range of −45° to +45° with respect to that direction. The term "up" is not limited to the vertical upward direction, but is inclusive of any inclined direction that is in the range of −45° to +45° with respect to the vertical upward direction. The term "down" is not limited to the vertical downward direction, but is inclusive of any inclined direction that is in the range of −45° to +45° with respect to the vertical downward direction. In the present specification and claims, the terms "down" and "downward" generally refer to the relationship of an object and the ground, or the surface on which the vehicle, such as the motorcycle, is resting with its wheels or tires on the ground or surface. In other words, the direction of the ground or surface on which the tires are resting relative to an object on the vehicle is generally down or downward relative to the object on the vehicle.

A front portion of an object refers to a portion that is forward of the middle of the object in the vehicle front-rear direction, unless specified otherwise. A rear portion of an object refers to a portion that is rearward of the middle of the object in the vehicle front-rear direction. In the present specification and claims, the term "integral" means one object is formed or manufactured simultaneously with another, such that they are not formed separately and later connected by fasteners or welds, but rather they are formed together and merge seamlessly into each other.

A steering shaft (not shown) is supported on the head pipe 2 so that the steering shaft can rotate left and right. The handle 5 is secured on an upper portion of the steering shaft. A front fork 9 is secured on a lower portion of the steering shaft. The front wheel 6 including a tire 6a is supported on a lower portion of the front fork 9. A front fender 10 is placed above the front wheel 6. A rear arm 12 is supported on the vehicle body frame 3 via a pivot shaft 11 so that the rear arm 12 can pivot up and down. The rear wheel 7 including a tire 7a is supported on a rear end portion of the rear arm 12. The engine unit 4 and the rear wheel 7 are linked together via a transmission member 13 such as a chain.

Figure 2:
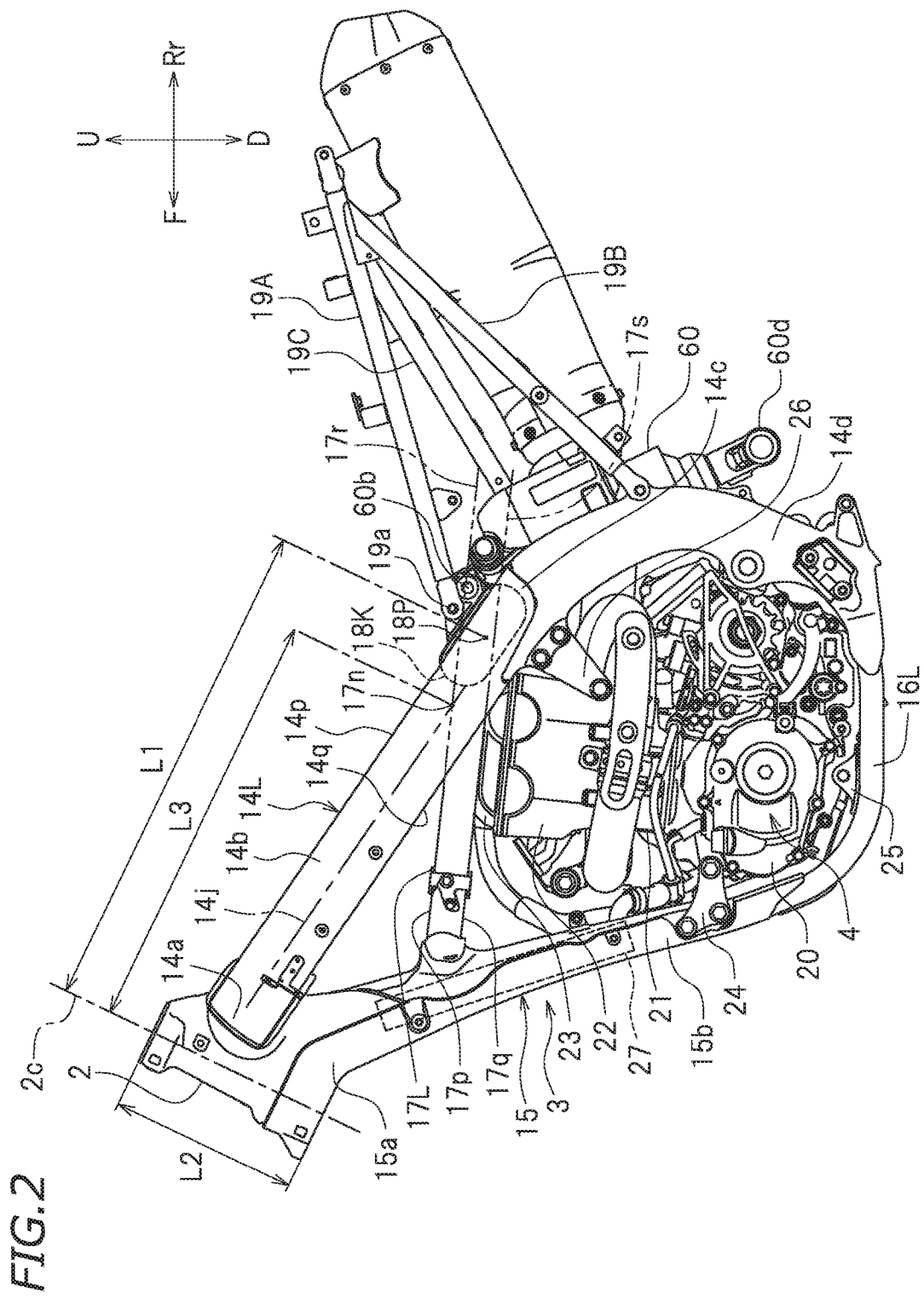
FIG. 2 is a side view of a portion of the motorcycle.
Figure 3:
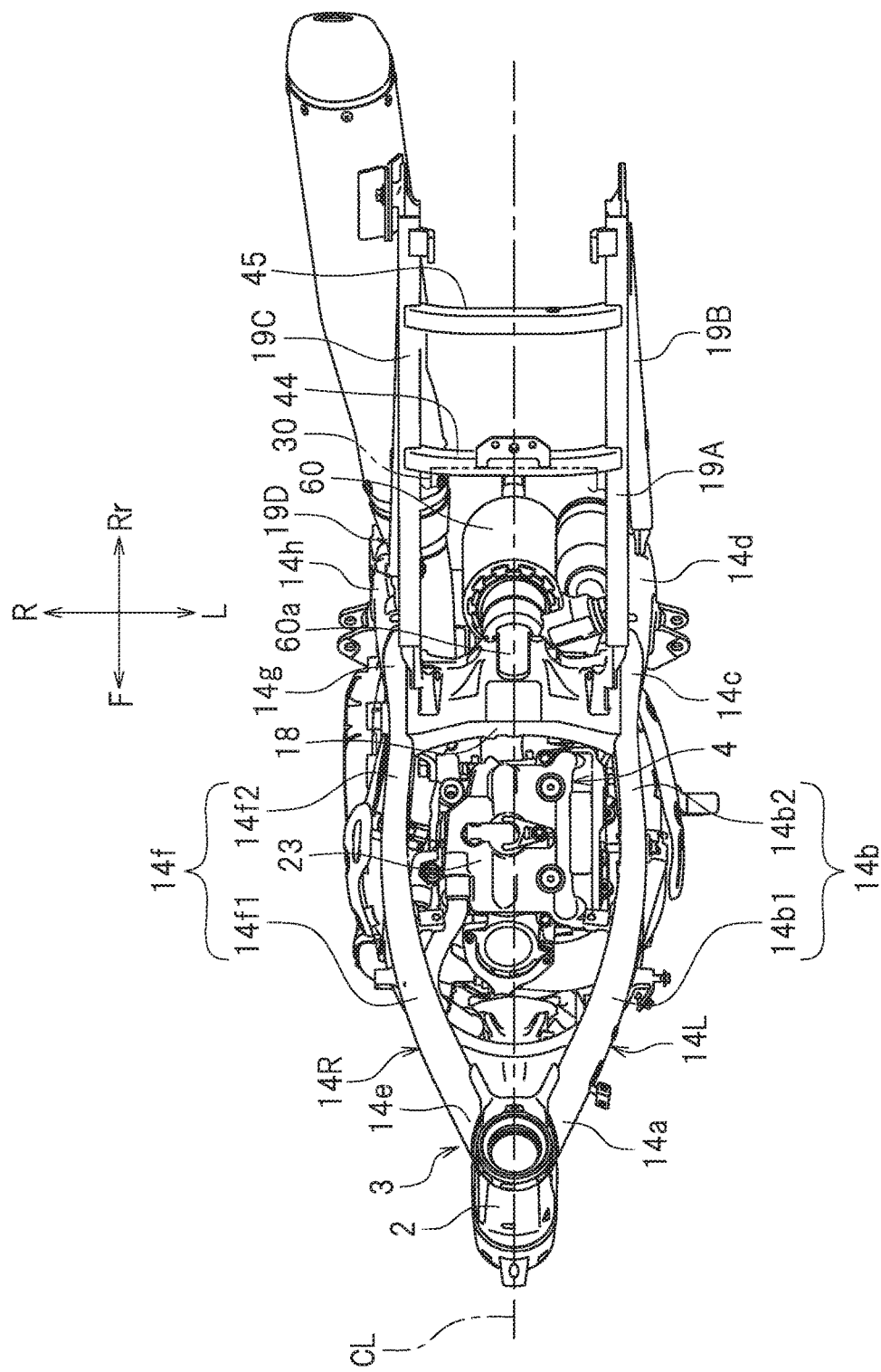
FIG. 3 is a plan view of a portion of the motorcycle.

FIG. 2 is a side view of a portion of the motorcycle 1, and FIG. 3 is a plan view of a portion of the motorcycle 1. The vehicle body frame 3 includes a left main frame 14L and a right main frame 14R each extending rearward from the head pipe 2. The vehicle body frame 3 includes a down frame 15 extending downward from the head pipe 2. The left main frame 14L is placed leftward of the vehicle center line CL, and the right main frame 14R is placed rightward of the vehicle center line CL. The down frame 15 is placed below the left main frame 14L and the right main frame 14R.

The left main frame 14L includes a first connecting portion 14a connected to the head pipe 2, a first front-rear extending portion 14b extending rearward from the first connecting portion 14a, and a first up-down extending portion 14d extending downward from a lower end 14c of the first front-rear extending portion 14b. As shown in FIG. 3, the shapes of the left main frame 14L and the right main frame 14R are in left-right symmetry with each other. The right main frame 14R includes a second connecting portion 14e connected to the head pipe 2, a second front-rear extending portion 14f extending rearward from the second connecting portion 14e, and a second up-down extending portion 14h extending downward from a lower end 14g of the second front-rear extending portion 14f. As shown in FIG. 2, the left main frame 14L has an upper outline 14p and a lower outline 14q, as the vehicle is seen from the side. Although not shown in the figure, the right main frame 14R has a similar upper outline 14p and a similar lower outline 14q. As the vehicle is seen from the side, the upper outline 14p of the left main frame 14L and the upper outline 14p of the right main frame 14R are laid on each other, and the lower outline 14q of the left main frame 14L and the lower outline 14q of the right main frame 14R are laid on each other.

As shown in FIG. 3, the first front-rear extending portion 14b of the left main frame 14L includes a first portion 14b1 that deviates outward (i.e., leftward) in the vehicle width direction while extending rearward from the head pipe 2, and a second portion 14b2 that deviates inward (i.e., rightward) in the vehicle width direction while extending rearward from the first portion 14b1. The second front-rear extending portion 14f of the right main frame 14R includes a first portion 14f1 that deviates outward (i.e., rightward) in the vehicle width direction while extending rearward from the head pipe 2, and a second portion 14f2 that deviates inward (i.e., leftward) in the vehicle width direction while extending rearward from the first portion 14f1.

As shown in FIG. 2, the down frame 15 includes a third connecting portion 15a connected to the head pipe 2, and a third up-down extending portion 15b extending downward from the third connecting portion 15a. The third connecting portion 15a is located below the first connecting portion 14a and the second connecting portion 14e. As the vehicle is seen from the side, the inclination angle of the down frame 15 with respect to the horizontal line is greater than the inclination angle of the first front-rear extending portion 14b of the left main frame 14L with respect to the horizontal line and is greater than the inclination angle of the second front-rear extending portion 14f of the right main frame 14R with respect to the horizontal line.

The left main frame 14L and the down frame 15 are linked together via a left connecting frame 17L. Herein, the front end portion of the left connecting frame 17L is connected to the down frame 15, and the rear end portion of the left connecting frame 17L is connected to the first front-rear extending portion 14b of the left main frame 14L. Similarly, the right main frame 14R and the down frame 15 are linked together via a right connecting frame 17R. The front end portion of the right connecting frame 17R is connected to the down frame 15, and the rear end portion of the right connecting frame 17R is connected to the second front-rear extending portion 14f of the right main frame 14R. The dimension of the left connecting frame 17L in the up-down direction is smaller than the dimension of the left main frame 14L in the up-down direction. The dimension of the right connecting frame 17R in the up-down direction is smaller than the dimension of the right main frame 14R in the up-down direction. The left connecting frame 17L is thinner than the left main frame 14L, and the right connecting frame 17R is thinner than the right main frame 14R.

Figure 5:
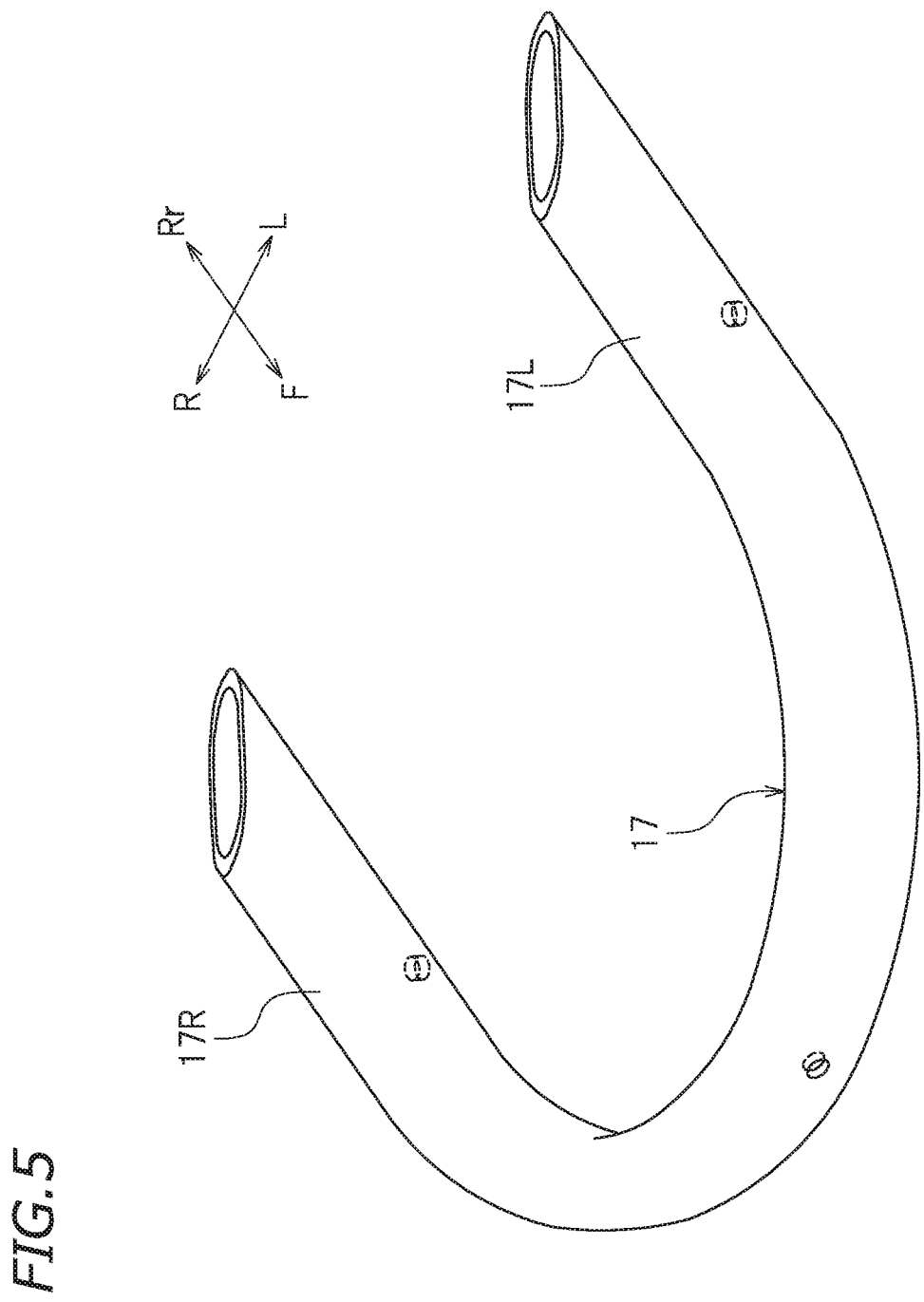
FIG. 5 is a perspective view of a left connecting frame and a right connecting frame.

The left connecting frame 17L and the right connecting frame 17R may be separate from each other or may be an integral piece. The left connecting frame 17L and the right connecting frame 17R are a single U-shaped pipe 17, as shown in FIG. 5. The pipe 17 is welded to the down frame 15. Herein, the left half of the pipe 17 is the left connecting frame 17L, and the right half thereof is the right connecting frame 17R.

Figure 4:
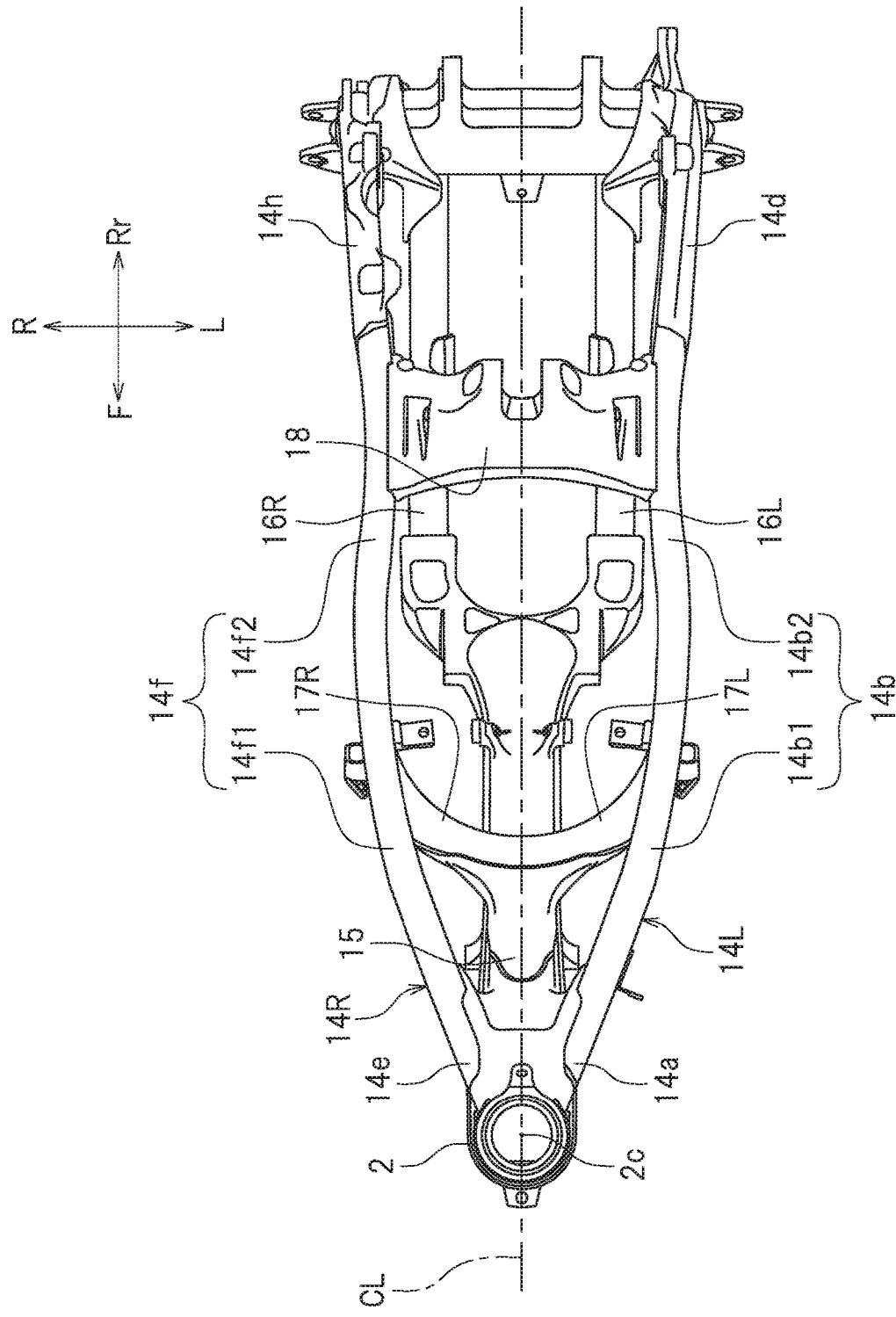
FIG. 4 is a plan view of a vehicle body frame.

As shown in FIG. 4, the first front-rear extending portion 14b of the left main frame 14L and the second front-rear extending portion 14f of the right main frame 14R are connected together via a cross frame 18. The cross frame 18 extends in the vehicle width direction. The left end portion of the cross frame 18 is connected to the first front-rear extending portion 14b, and the right end portion thereof is connected to the second front-rear extending portion 14f. Herein, the left end portion of the cross frame 18 is connected to the second portion 14b2 of the first front-rear extending portion 14b. The right end portion of the cross frame 18 is connected to the second portion 14f2 of the second front-rear extending portion 14f. The cross frame 18 is shaped so that the dimension thereof in the front-rear direction is larger than the dimension thereof in the up-down direction. Note however that this and the placement of the cross frame 18 are merely illustrative, and there is no particular limitation thereon.

The broken line 18K of FIG. 2 represents a cross section of the cross frame 18 at the center in the vehicle width direction. Note that in the present embodiment, the position of the center of the cross frame 18 in the vehicle width direction coincides with the position of the vehicle center line CL. Note that the vehicle center line CL is a line extending in the vehicle front-rear direction passing through a central axis 2c of the head pipe 2 as seen from above. As shown in FIG. 2, as the vehicle is seen from the side, a centroid 18P of the central cross section 18K in the vehicle width direction of the cross frame 18 is located within an area that is delimited by an upper extension 17r obtained by extending rearward an upper outline 17p of the left connecting frame 17L, a lower extension 17s obtained by extending rearward a lower outline 17q of the left connecting frame 17L, the upper outline 14p of the left main frame 14L and the lower outline 14*q* of the left main frame 14L. Moreover, as the vehicle is seen from the side, the centroid 18P is located within an area that is delimited by the upper extension 17*r* obtained by extending rearward the upper outline 17*p* of the right connecting frame 17R, the lower extension 17*s* obtained by extending rearward the lower outline 17*q* of the right connecting frame 17R, the upper outline 14*p* of the right main frame 14R and the lower outline 14*q* of the right main frame 14R.

In the motorcycle 1 according to the present embodiment, the cross frame 18 is placed at a position relatively far away from the head pipe 2. There is no particular limitation on the distance between the cross frame 18 and the head pipe 2, but the distance L1 between the central axis 2*c* of the head pipe 2 and the centroid 18P of the cross frame 18 is twice or more the dimension L2 of the head pipe 2 in the central axis direction. L1 may be two to three times L2.

In the motorcycle 1, a portion where the left connecting frame 17L and the left main frame 14L are connected together and a portion where the right connecting frame 17R and the right main frame 14R are connected together are placed at positions relatively far away from the head pipe 2. Herein, as the vehicle is seen from the side, the distance L3 between the intersection point 17*n* between the upper extension 17*r* of the left connecting frame 17L and the central line 14*j* of the left main frame 14L and the central axis 2*c* of the head pipe 2 is twice or more the dimension L2 of the head pipe 2 in the central axis direction. That is, L3≥2×L2. Similarly, as the vehicle is seen from the side, the distance L3 between the intersection point 17*n* between the upper extension 17*r* of the right connecting frame 17R and the central line 14*j* of the right main frame 14R and the central axis 2*c* of the head pipe 2 is twice or more the dimension L2 of the head pipe 2 in the central axis direction. That is, L3≥2×L2. The dimension L3 is set to a value close to the dimension L1. Herein, L3 is set to be 0.8 to 1 time L1. 0.8×L1≤L3≤1.0×L1. Note however that the relationship between L1 to L3 described above is illustrative, and there is no particular limitation thereon.

The vehicle body frame 3 includes left and right upper seat frames 19A and 19C and left and right lower seat frames 19B and 19D (see FIG. 3) supporting the seat 8. As shown in FIG. 3, the front end portions of the left and right upper seat frames 19A and 19C are connected to the cross frame 18. The upper seat frames 19A and 19C extend rearward from the cross frame 18. As the vehicle is seen from the side, points 19*a* at which the upper seat frames 19A and 19C are attached to the cross frame 18 are located above the upper extension 17*r* of the left connecting frame 17L and the upper extension 17*r* of the right connecting frame 17R. Note however that there is no particular limitation on the position of the point of attachment 19*a*. The front end portion of the left lower seat frame 19B is connected to the first up-down extending portion 14*d* of the left main frame 14L. The rear end portion of the left upper seat frame 19A and the rear end portion of the left lower seat frame 19B are connected to each other. The front end portion of the right upper seat frame 19C is connected to the second up-down extending portion 14*h* of the right main frame 14R. The rear end portion of the right upper seat frame 19C and the rear end portion of the right lower seat frame 19D are connected together.

As shown in FIG. 3, a rear cross frame 44 and a rear cross frame 45 located rearward of the rear cross frame 44 are connected to the left upper seat frame 19A and the right upper seat frame 19C.

As shown in FIG. 2 and FIG. 4, the vehicle body frame 3 includes a left lower frame 16L that connects together the down frame 15 and the first up-down extending portion 14*d* of the left main frame 14L, and a right lower frame 16R that connects together the down frame 15 and the second up-down extending portion 14*h* of the right main frame 14R. The front end portion of the left lower frame 16L and the front end portion of the right lower frame 16R are connected to the lower end portion of the third up-down extending portion 15*b* of the down frame 15. The rear end portion of the left lower frame 16L is connected to the lower end portion of the first up-down extending portion 14*d*. The rear end portion of the right lower frame 16R is connected to the lower end portion of the second up-down extending portion 14*h*.

As shown in FIG. 3, an upper end portion 60*a* of a rear cushion unit 60 is supported on the cross frame 18. The upper end portion 60*a* of the rear cushion unit 60 is pivotally supported on the central portion of the cross frame 18 in the vehicle width direction. In FIG. 2, reference sign 60*b* represents the pivotal point of the upper end portion 60*a* of the rear cushion unit 60. Reference sign 60*d* represents the lower end portion of the rear cushion unit 60. As the vehicle is seen from the side, the pivotal point 60*b* is located between the upper extension 17*r* obtained by extending rearward the upper outline 17*p* of the left connecting frame 17L and the lower extension 17*s* obtained by extending rearward the lower outline 17*q* of the left connecting frame 17L. Although not shown in the figure, the pivotal point 60*b* is located between the upper extension 17*r* obtained by extending rearward the upper outline 17*p* of the right connecting frame 17R and the lower extension 17*s* obtained by extending rearward the lower outline 17*q* of the right connecting frame 17R, as the vehicle is seen from the side. The pivotal point 60*b* is placed upward and rearward of the upper outline 14*p* of the left main frame 14L and the right main frame 14R, as the vehicle is seen from the side, in the present embodiment, but there is no particular limitation on the placement of the pivotal point 60*b*.

The engine unit 4 includes a crankcase 20, a cylinder body 21, a cylinder head 22 and a cylinder head cover 23. The cylinder body 21 is placed on top of the crankcase 20, the cylinder head 22 is placed on top of the cylinder body 21, and the cylinder head cover 23 is placed on top of the cylinder head 22. Although not shown in the figure, the crank shaft of the internal combustion engine is accommodated inside the crankcase 20. A cylinder that slidably accommodates a piston therein is formed inside the cylinder body 21. An intake port and an exhaust port are formed in the cylinder head 22, and an intake cam and an exhaust cam are accommodated in the cylinder head 22. The cylinder head cover 23 is connected to the upper portion of the cylinder head 22.

The engine unit 4 is suspended on the vehicle body frame 3. A portion of the engine unit 4 is supported on the down frame 15 via a bracket 24. Another portion of the engine unit 4 is supported on the lower frames 16L and 16R via brackets 25. Another portion of the engine unit 4 is supported on the main frames 14L and 14R via brackets 26.

As shown in FIG. 2, the left connecting frame 17L and the cylinder head cover 23 partially overlap with each other, as the vehicle is seen from the side. Similarly, the right connecting frame 17R and the cylinder head cover 23 partially overlap with each other, as the vehicle is seen from the side.

The internal combustion engine of the engine unit 4 is a water-cooled internal combustion engine. The motorcycle 1 includes a radiator 27. The radiator 27 serves to radiate heat of the cooling water of the internal combustion engine. The radiator 27 is supported on the vehicle body frame 3. The radiator 27 is secured on the down frame 15. The radiator 27 is placed forward of the engine unit 4. The radiator 27 is placed below the head pipe 2.

Figure 6:
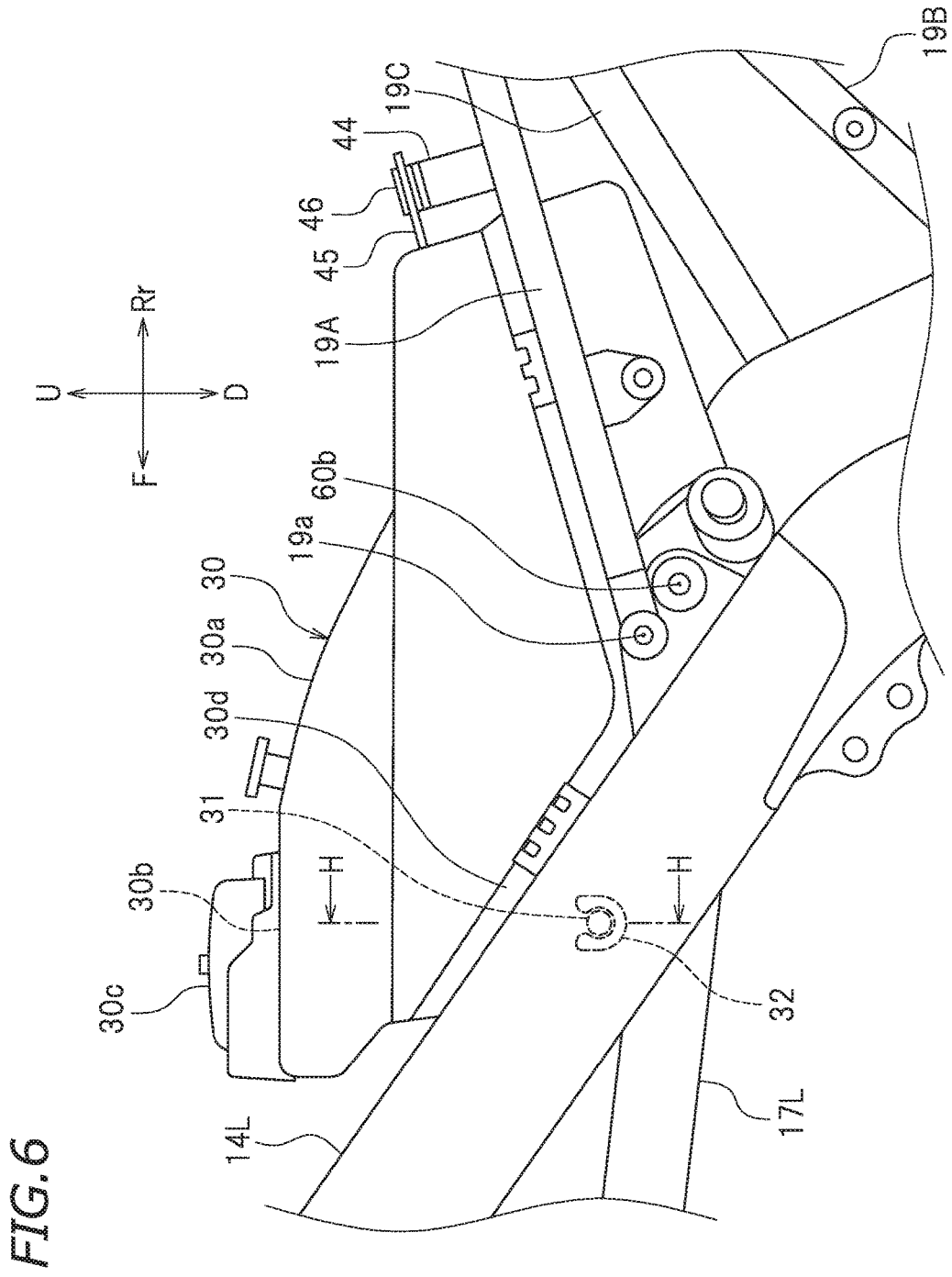
FIG. 6 is a side view of a fuel tank and a portion of the vehicle body frame.
Figure 7:
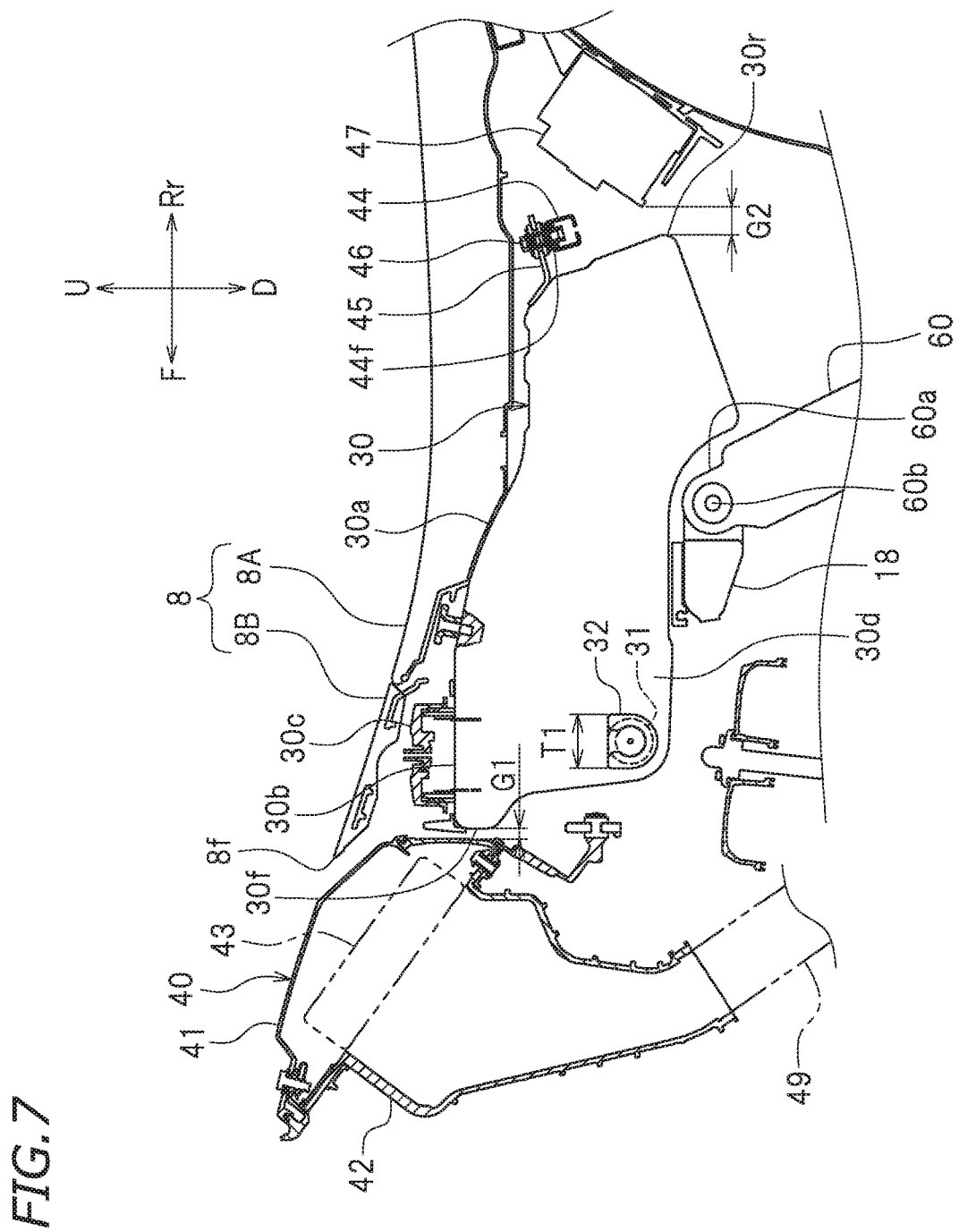
FIG. 7 is a side view schematically showing a portion of the motorcycle.

As shown in FIG. 6, the motorcycle 1 includes a fuel tank 30. Fuel to be supplied to the internal combustion engine of the engine unit 4 is stored in the fuel tank 30. As shown in FIG. 7, the fuel tank 30 includes a tank body 30a, and a cap 30c attached to an oil fill port 30b in the upper portion of the tank body 30a. There is no particular limitation on the position of the cap 30c, but the cap 30c is placed in the front portion of the tank body 30a. The tank body 30a includes a left and a right side wall 30d. Note that the shape of the fuel tank 30 is simplified in FIG. 7.

Figure 8:
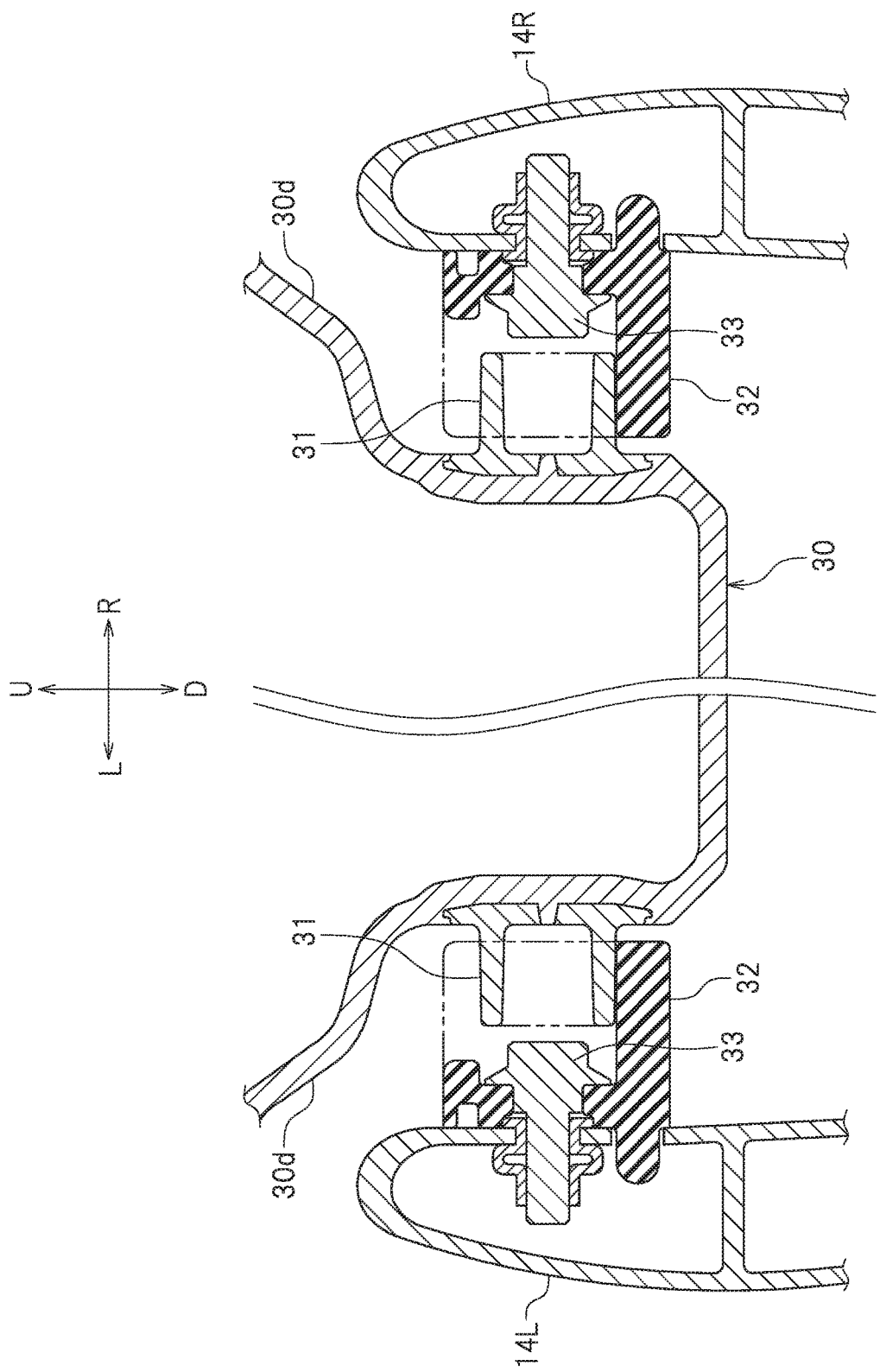
FIG. 8 is a cross-sectional view taken along line H-H of FIG. 6.

FIG. 8 shows a cross section taken along line H-H of FIG. 6. Note however that the central portion in the vehicle width direction is not shown. As shown in FIG. 8, the left and right side walls 30d are each provided with a protruding member 31 extending sideways. While the protruding member 31 is herein formed by a cylindrical member, the present invention is not limited to a cylindrical shape. Although the protruding member 31 may be assembled onto the side wall 30d via a bolt, or the like, according to one embodiment, the protruding member 31 is integral with the side wall 30d. In the embodiment illustrated in FIG. 8, the protruding member 31 and the side wall 30d are made of a resin and are integral together. As shown in FIG. 7, the protruding member 31 is provided in the front portion of the side wall 30d. The protruding member 31 is placed directly below the cap 30c, as the vehicle is seen from the side. Note however that there is no particular limitation on the position of the protruding member 31.

Figure 9:
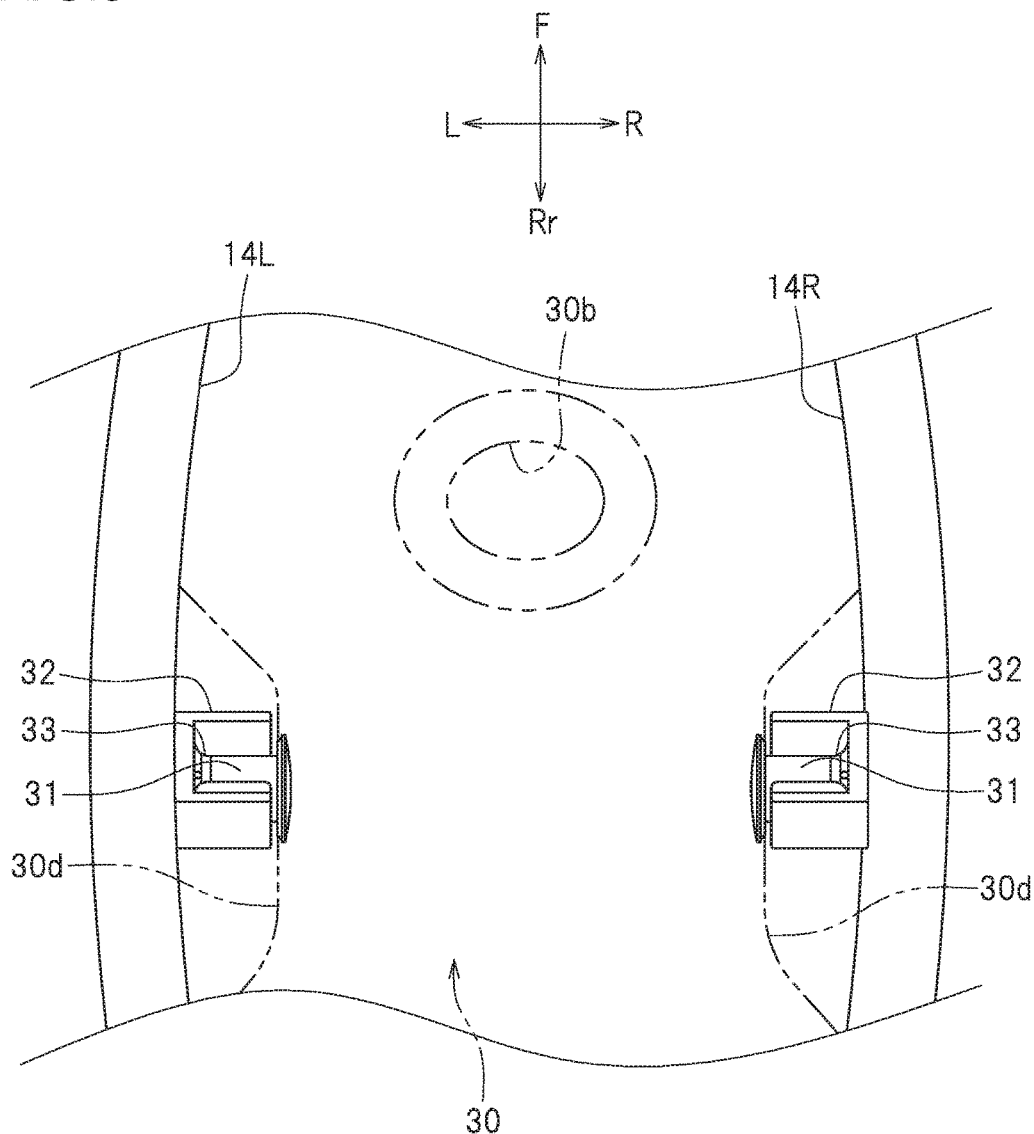
FIG. 9 is a plan view of a main frame, a protruding member and a rubber bracket.
Figure 10:
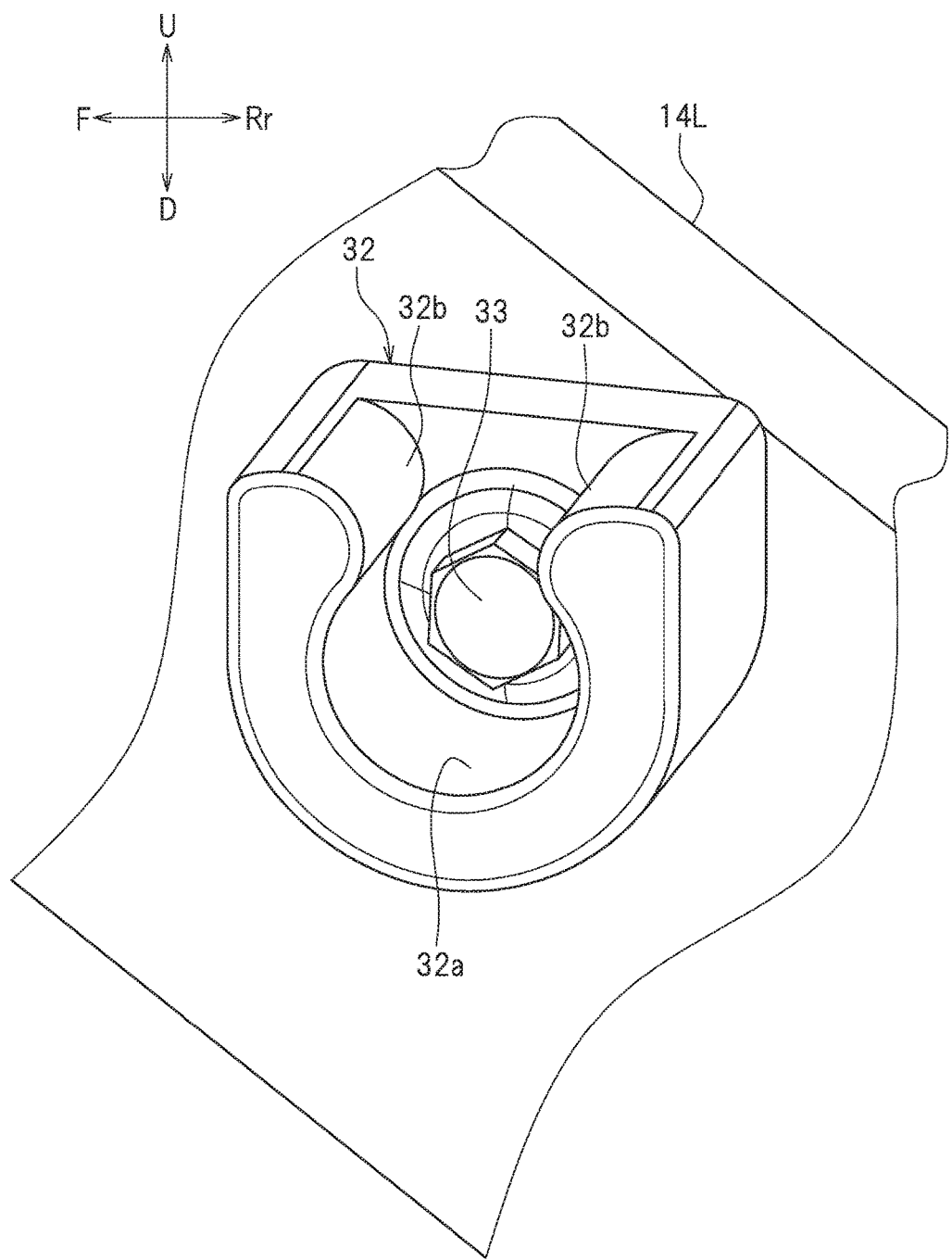
FIG. 10 is a perspective view of the rubber bracket.

As shown in FIG. 9, rubber brackets 32 are attached to the left main frame 14L and the right main frame 14R. The rubber brackets 32 are fastened to the left main frame 14L and the right main frame 14R via bolts 33. Note however that there is no limitation on the attachment of the rubber brackets 32. The rubber brackets 32 are attached to the inner surfaces in the vehicle width direction of the left main frame 14L and the right main frame 14R. As shown in FIG. 6, the left main frame 14L and the rubber bracket 32 are laid on each other, as the vehicle is seen from the side. The right main frame 14R and the rubber bracket 32 are laid on each other, as the vehicle is seen from the side. As shown in FIG. 10, the rubber brackets 32 are formed in a concave shape that is open upward. Also, the rubber brackets 32 are open on the inner side thereof in the vehicle width direction.

As shown in FIG. 8 and FIG. 9, the rubber brackets 32 are configured to engage with the protruding members 31 of the fuel tank 30. When the protruding members 31 are pushed into the rubber brackets 32 in the downward direction, the protruding members 31 are fitted into the rubber brackets 32. The protruding members 31 can be fitted into the rubber brackets 32 simply by pushing down the fuel tank 30 from above. Thus, the front portion of the fuel tank 30 is supported on the main frames 14L and 14R via the protruding members 31 and the rubber brackets 32. As shown in FIG. 10, the rubber bracket 32 includes a supporting portion 32a that supports the protruding member 31, and a pair of, front and rear, barb portions 32b located above the supporting portion 32a. The front barb portion 32b bulges rearward while extending upward, and the rear barb portion 32b bulges forward while extending upward. The barb portions 32b are formed so that the interval therebetween narrows while extending upward. Therefore, once the protruding member 31 is supported on the supporting portion 32a, the protruding member 31 is unlikely to come off the rubber bracket 32.

As shown in FIG. 7, a bracket 45 is secured on a portion of the fuel tank 30 that is rearward of the middle of the fuel tank 30 in the vehicle front-rear direction. The bracket 45 is an example of a fastened portion of the fuel tank 30. The bracket 45 is fastened to the vehicle body frame 3 via a bolt 46. Herein, the bracket 45 is fastened to the rear cross frame 44 via the bolt 46. A rear end 30r of the fuel tank 30 is located rearward of a front end 44f of the rear cross frame 44. A portion of the fuel tank 30 overlaps with the rear cross frame 44, as the vehicle is seen from above (see FIG. 3).

The seat 8 is placed over the fuel tank 30. At least a portion of the seat 8 is supported on the fuel tank 30. The seat 8 includes a main seat 8A, and a sub-seat 8B placed forward of the main seat 8A. The front end of the main seat 8A and the front end of the sub-seat 8B are located forward of the middle position of the fuel tank 30 in the vehicle front-rear direction. A front end 8f of the sub-seat 8B is the front end of the seat 8. The front end 8f of the seat 8 is located forward of the middle position of the fuel tank 30 in the vehicle front-rear direction. The front end 8f of the seat 8 is located forward of a front end 30f of the fuel tank 30 in the vehicle front-rear direction. Note however that the placement of the seat 8 is illustrative, and there is no particular limitation thereon.

An air cleaner 40 is placed forward of the fuel tank 30. The fuel tank 30 is placed near the air cleaner 40. The minimum interval G1 between the fuel tank 30 and the air cleaner 40 in the vehicle front-rear direction is smaller than the dimension T1 of the rubber bracket 32 in the vehicle front-rear direction. A battery 47 is placed rearward of the fuel tank 30. The fuel tank 30 is placed near the battery 47. The minimum interval G2 between the fuel tank 30 and the battery 47 in the vehicle front-rear direction is smaller than the dimension T1 of the rubber bracket 32 in the vehicle front-rear direction.

The air cleaner 40 is placed rearward of the head pipe 2. The air cleaner 40 includes an upper case 41, a lower case 42 placed below the upper case 41, and an air cleaner element 43 provided between the upper case 41 and the lower case 42. The air cleaner 40 is configured so that the air introduced into the upper case 41 is cleaned while passing through the air cleaner element 43, and the cleaned air is supplied to the lower case 42. An intake pipe 49, provided with a throttle body (not shown), etc., is connected to the lower portion of the lower case 42. The intake pipe 49 connects between the air cleaner 40 and the internal combustion engine of the engine unit 4.

As shown in FIG. 1, the motorcycle 1 includes a left and a right side cover 50. The left and right side covers 50 are placed leftward and rightward of the vehicle center line CL, respectively. The left side cover 50 and the right side cover 50 may be placed in left-right symmetry, or left-right asymmetry, with each other with respect to a vertical plane containing the vehicle center line CL. The shape of the left side cover 50 and the right side cover 50 may be in left-right symmetry, or left-right asymmetry, with each other with respect to a vertical plane containing the vehicle center line CL. For example, the shape of the surface-side portion (in other words, the outer portion in the vehicle width direction) of the left side cover 50 and the right side cover 50 may be in left-right symmetry while the shape of the reverse-side portion (in other words, the inner portion in the vehicle width direction) may be in left-right asymmetry. The shape of the left side cover 50 and the right side cover 50 may be in left-right symmetry at least with respect to a duct formation portion 50*d* to be described below. The left side cover 50 will be described below and the description of the right side cover 50 will be omitted.

Figure 11:
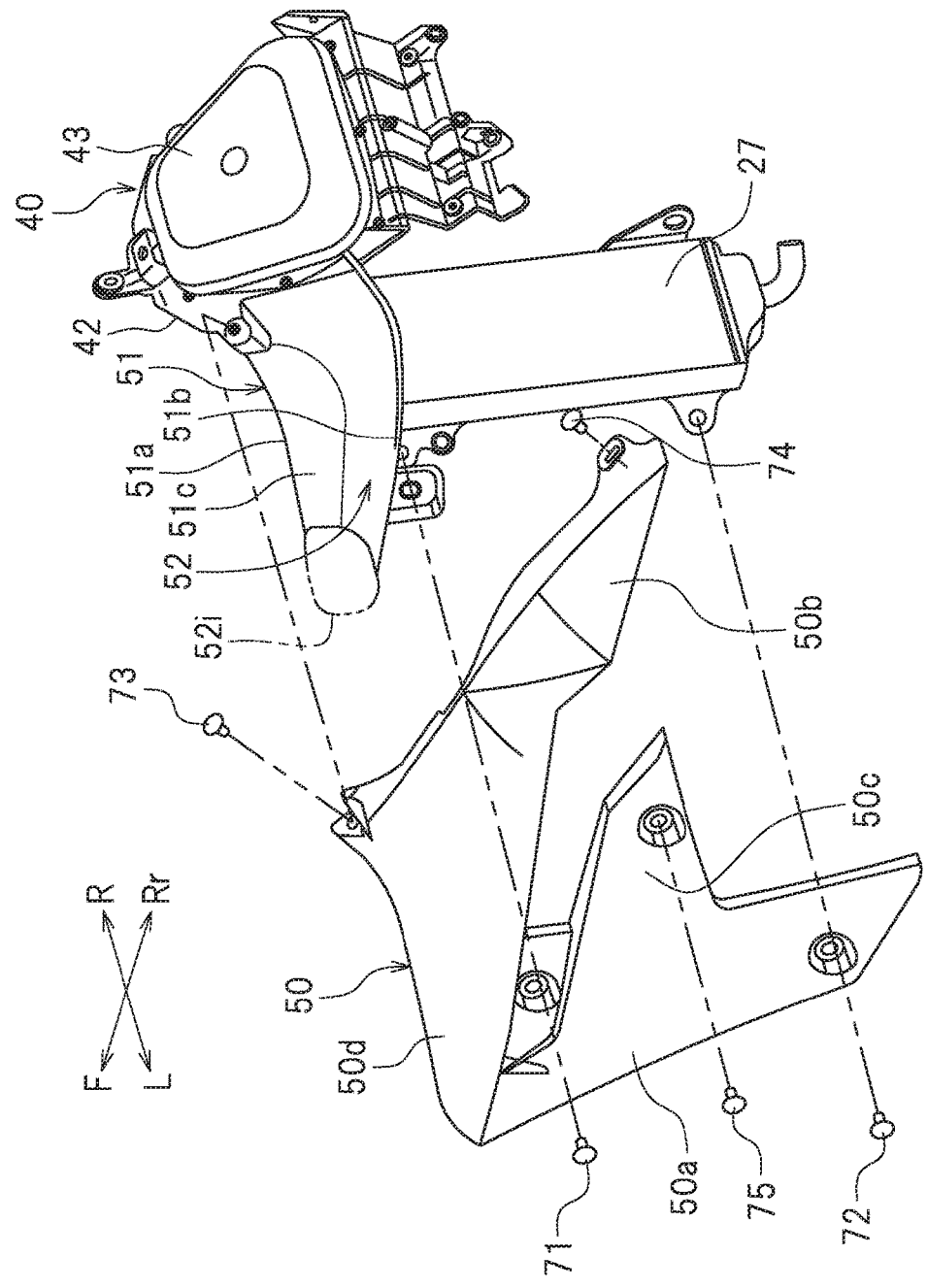
FIG. 11 is an exploded perspective view of a portion of a side cover, a duct part and an air cleaner, and a radiator.

While the side cover 50 may be composed of a plurality of parts, it is in the present embodiment an integral large cover to be assembled onto other members, as shown in FIG. 11. In the present embodiment, the side cover 50 is a single, integral part. As shown in FIG. 1, a portion of the side cover 50 is placed below the cylinder head cover 23 of the engine unit 4. A portion of the side cover 50 is placed below the cylinder head 22 of the engine unit 4. The side cover 50 includes a radiator cover portion 50*a* placed outward of the radiator 27 in the vehicle width direction, a tank cover portion 50*b* placed outward of the fuel tank 30 in the vehicle width direction, and a rearward portion 50*c* placed outward of at least a portion of the intake pipe 49 in the vehicle width direction. The side cover 50 includes the duct formation portion 50*d* placed forward of the tank cover portion 50*b*. The duct formation portion 50*d* is located above the radiator cover portion 50*a* and the rearward portion 50*c*.

While there is no particular limitation in the present invention on the material of the side cover 50, according to one embodiment, it is made of a resin. While there is no particular limitation in the present invention on the method for manufacturing the side cover 50, according to one embodiment, it is manufactured by injection molding. According to one embodiment, the side cover 50 is an injection-molded part.

As shown in FIG. 11, a duct part 51 extending forward in the vehicle front-rear direction from the lower case 42 is formed integrally with the lower case 42 of the air cleaner 40. A pair of, left and right, duct parts 51 are provided. In the present embodiment, the lower case 42 and the duct parts 51 are made of a resin, and are formed integrally together. However, embodiments of the invention encompass a lower case 42 and duct parts that are made of any material adequate for forming a shell or cover for engine parts. In addition, embodiments of the invention encompass a lower case 42 and duct parts 51 made separately and connected by fasteners, including bolts, screws, and welds.

Figure 12:
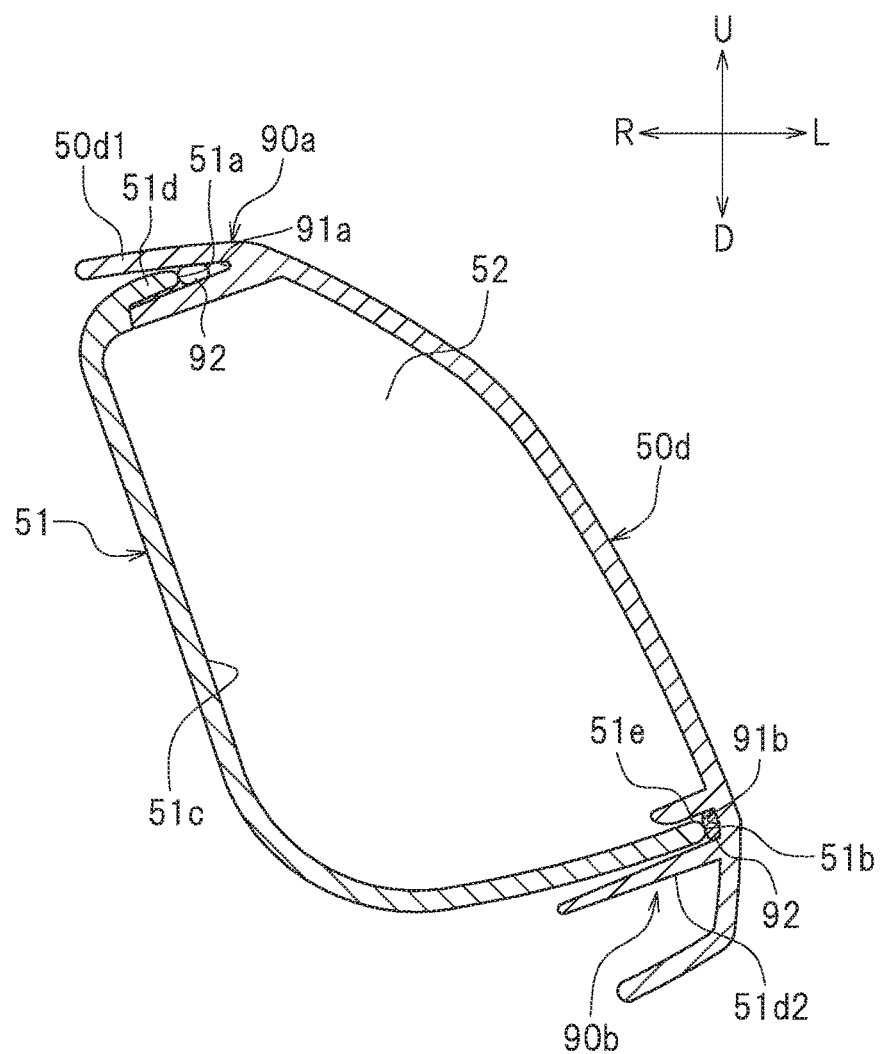
FIG. 12 is a cross-sectional view taken along line K-K of FIG. 1, showing the side cover and the duct part.

FIG. 12 is a cross-sectional view taken along line K-K of FIG. 1, showing the side cover 50 and the duct part 51. The duct part 51 is assembled onto the duct formation portion 50*d* of the side cover 50, thereby defining a duct 52 connected to the internal space between the upper case 41 and the air cleaner element 43 in the air cleaner 40.

Figure 14:
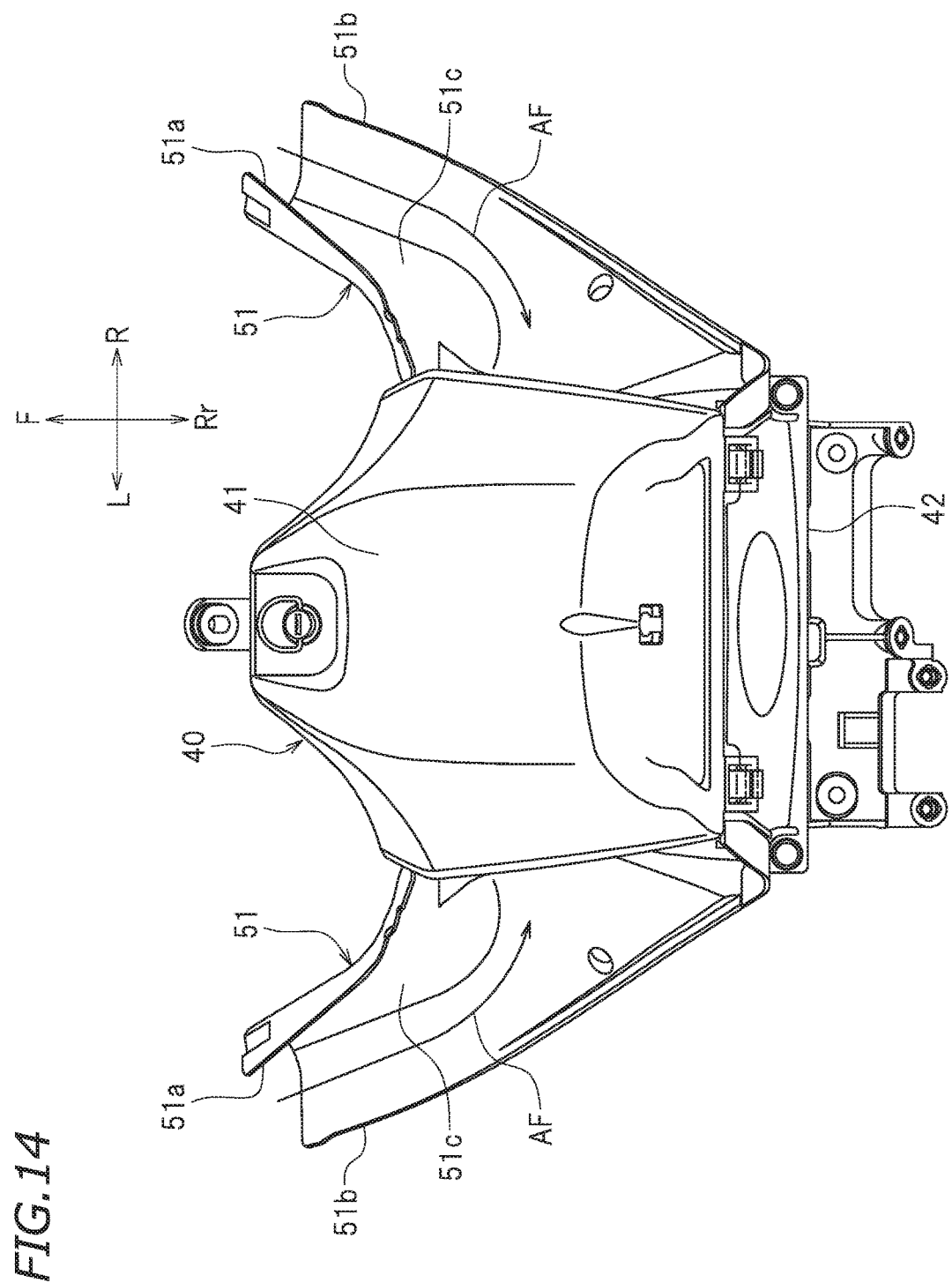
FIG. 14 is a plan view of the air cleaner and the duct part.
Figure 15:
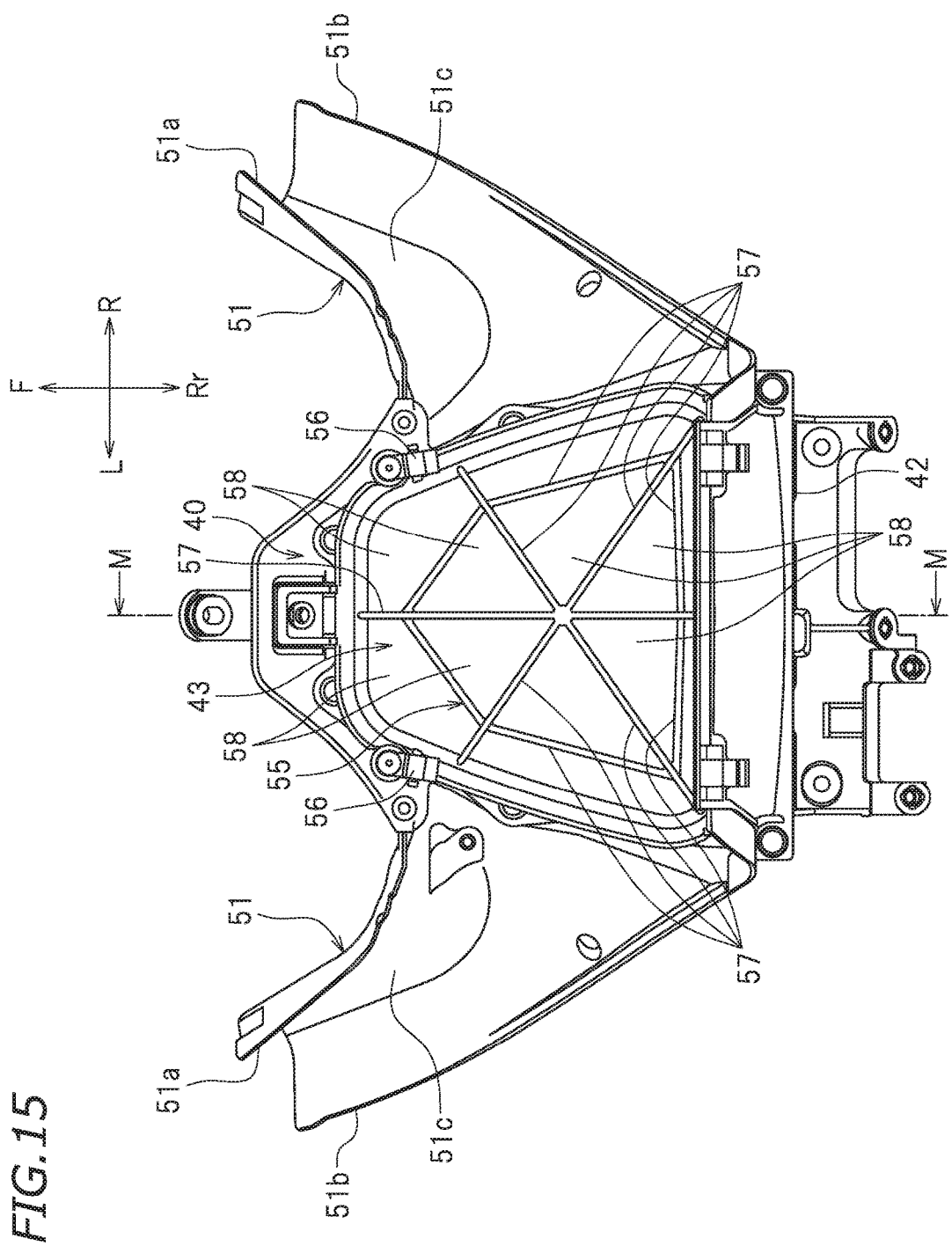
FIG. 15 is a plan view of the air cleaner and the duct part, with an upper case removed.

As shown in FIG. 14 and FIG. 15, the duct part 51 includes an upper edge 51*a* extending in the vehicle front-rear direction, a lower edge 51*b* extending in the vehicle front-rear direction and located below the upper edge 51*a*, and an inner wall 51*c* located between the upper edge 51*a* and the lower edge 51*b* and depressed inward in the vehicle width direction. As shown in FIG. 12, the duct formation portion 50*d* of the side cover 50 includes an upper C-shaped-section portion 90*a* and a lower C-shaped-section portion 90*b*. Grooves 91*a* and 91*b* are formed in the C-shaped-section portions 90*a* and 90*b*, respectively. The upper edge 51*a* of the duct part 51 is fitted into the groove 91*a*, and the lower edge 51*b* is fitted into the groove 91*b*. Note that reference sign 92 is a sealant. An upper portion 51*d* of the duct part 51 and an upper portion 50*d*1 of the duct formation portion 50*d* are stacked on each other. A lower portion 51*e* of the duct part 51 and a lower portion 51*d*2 of the duct formation portion 50*d* are stacked on each other. The lower edge 51*b* of the duct part 51 is located outward of the upper edge 51*a* in the vehicle width direction.

Figure 13:
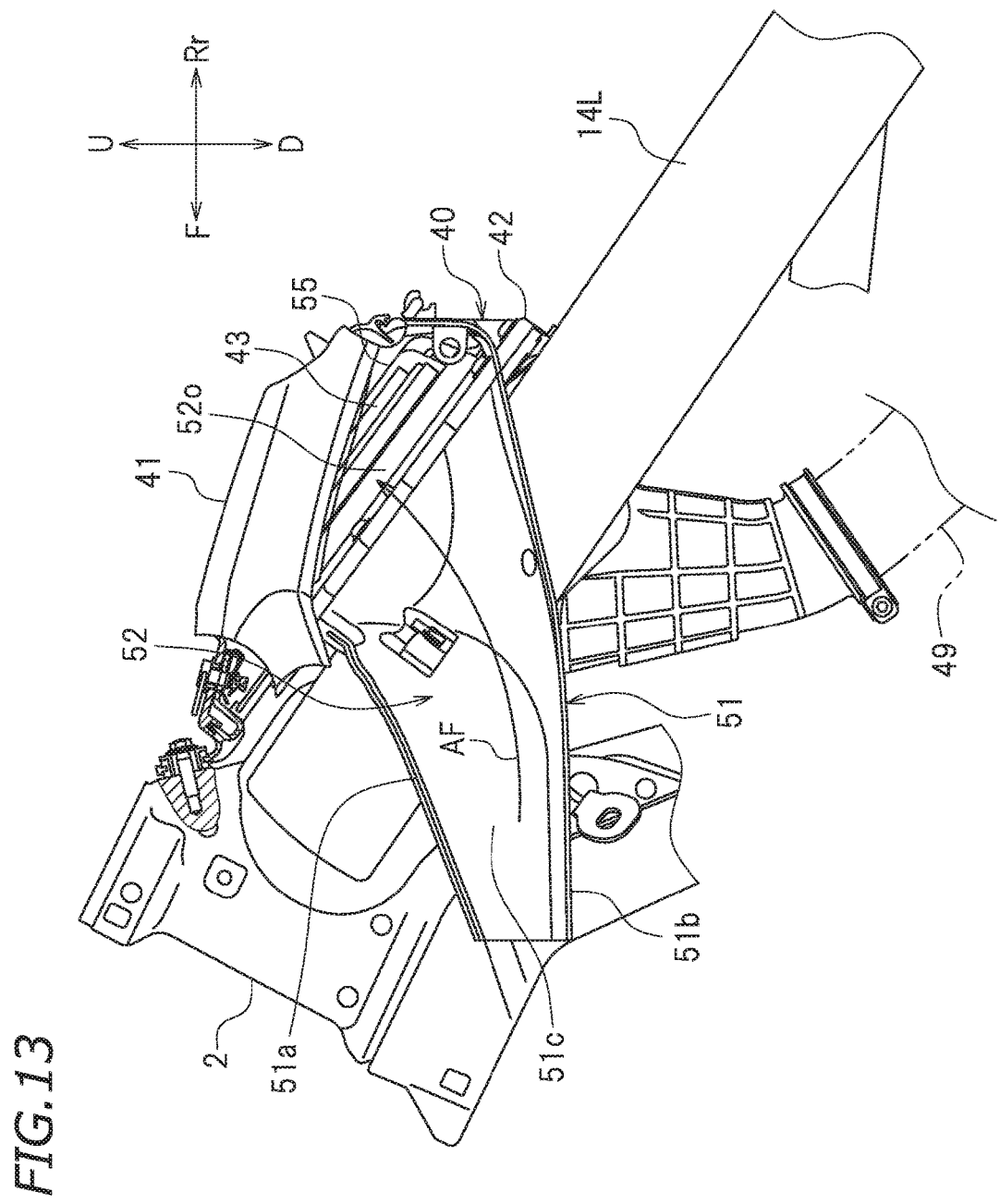
FIG. 13 is a side view of the air cleaner and the duct part.

An air inlet 52*i* that is open in the forward direction or in the inner direction of the vehicle width direction is formed at the front end of the duct 52 (see FIG. 11). The air inlet 52*i* is partitioned by the duct formation portion 50*d* of the side cover 50 and the duct part 51. The air is introduced into the duct 52 through the air inlet 52*i*. FIG. 13 is a side view of the air cleaner 40 and the duct part 51. As shown in FIG. 13, an air outlet 52*o* is formed at the rear end of the duct 52. The air outlet 52*o* is open toward the internal space between the upper case 41 and the air cleaner element 43 of the air cleaner 40. Note that the arrow AF in the figure represents the air flow.

Figure 16:
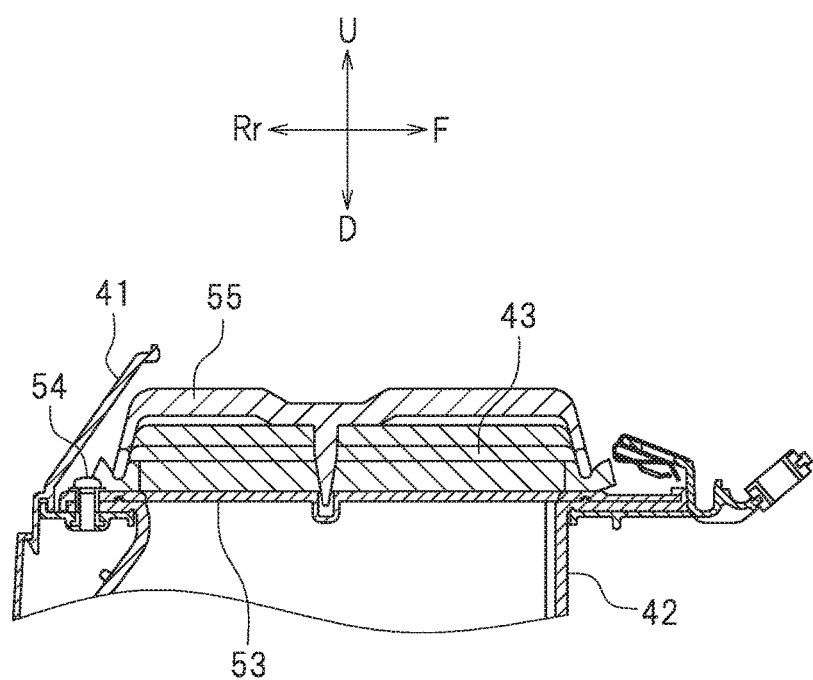
FIG. 16 is a cross-sectional view taken along line M-M of FIG. 15.

FIG. 14 is a plan view of a portion of the air cleaner 40 and the duct part 51. FIG. 15 is a plan view of a portion of the air cleaner 40 and the duct part 51, with the upper case 41 removed. FIG. 16 is a cross-sectional view taken alone line M-M of FIG. 15. As shown in FIG. 16, a holder 53 is fastened to the lower case 42 via a bolt 54. The air cleaner element 43 is placed on the holder 53, and a holder 55 is placed on the air cleaner element 43. As shown in FIG. 15, the holder 53 and the holder 55 each include a plurality of linear members 57. The holder 53 and the holder 55 are formed in a lattice pattern. Air paths 58, through which the air passes, are formed between the linear members 57. A portion of the holder 55 is inserted into the central portion of the holder 53 (see FIG. 16). The holder 55 is held down by a plate material 56. The holder 55 and the holder 53 are assembled together, as described above, with the air cleaner element 43 sandwiched between the holder 55 and the holder 53 (see FIG. 16). Thus, the air cleaner element 43 is held between the upper case 41 and the lower case 42.

As shown in FIG. 11, the side cover 50, the duct part 51 and the radiator 27 are assembled together via a bolt 71. The lower portion of the side cover 50 and the lower portion of the radiator 27 are assembled together via a bolt 72. The side cover 50 and the vehicle body frame 3 (not shown in FIG. 11) are assembled together via a bolt 75. The bolts 71, 72 and 75 are fastened from the side. A portion of the side cover 50 and a portion of the lower case 42 are laid on each other and are fastened together via a bolt 73. The tank cover portion 50*b* of the side cover 50 and the fuel tank 30 (not shown in FIG. 11) are fastened together via a bolt 74. The bolt 73 and the bolt 74 are fastened from above. Note that while bolts 71 to 75 are an example fastener, the fastener is not limited to bolts. The fastener may be screws, or the like.

As described above, with the motorcycle 1 according to the present embodiment, the duct part 51 forming a part of the duct 52 is formed integrally with the lower case 42 of the air cleaner 40. Moreover, the duct formation portion 50*d* being a part of the side cover 50 forms another part of the duct 52. Therefore, the number of parts can be reduced as compared with a case in which the duct 52, the lower case 42 of the air cleaner 40 and the side cover 50 are separate from each other. There is no need for a structure used for fastening together the lower case 42 of the air cleaner 40 and the duct 52 or a structure used for fastening together the side cover 50 and the duct 52, and there is no need for the operation of fastening them together. Furthermore, since there is no need to have the side cover 50 and the duct 52 laid over each other in the vehicle width direction, it is possible to prevent the side cover 50 and the duct 52 from becoming large in the vehicle width direction. This makes knee gripping easier. Thus, with the motorcycle 1 according to the present embodiment, it is possible to reduce the number of parts and make knee gripping easier.

The side cover 50 includes the radiator cover portion 50*a* placed outward of the radiator 27 in the vehicle width direction. The side cover 50 is relatively large. It is possible to reduce the number of connecting portions as compared with cases in which a plurality of resin parts are connected together to provide the side cover 50. The present embodiment eliminates the connection between a plurality of parts, and the present embodiment concentrates and integrates functions into a single part, thus allowing for an increase in the rigidity of the side cover 50.

The air having passed through the duct 52 is guided into the air cleaner 40. According to the present embodiment, the duct part 51 and the lower case 42 of the air cleaner 40 are an integral part, and there is no joint between the duct part 51 and the lower case 42. Thus, it is possible to reduce the air resistance, and to smoothly guide the air into the air cleaner 40 through the duct 52.

While embodiments of the present invention are not limited to any one shape of the duct part 51, as long as the duct part 51 is integral with the lower case 42 of the air cleaner 40, the duct part 51 has a shape as defined below in the present embodiment. That is, the duct part 51 includes an upper edge 51a and a lower edge 51b extending in the vehicle front-rear direction, and an inner wall 51c located between the upper edge 51a and the lower edge 51b and depressed inward in the vehicle width direction. Thus, it is possible to form a desirable duct 52.

While the duct 52 is formed by the duct part 51 and the duct formation portion 50d of the side cover 50, the upper edge 51a and the lower edge 51b of the duct part 51 are fitted into upper and lower grooves 91a and 91b of the duct formation portion 50d, respectively, as shown in FIG. 12, according to the present embodiment. The upper portions 51d and 50d1 of the duct part 51 and the duct formation portion 50d are laid on each other in the up-down direction, and the lower portions 51e and 51d2 thereof are laid on each other in the up-down direction. Therefore, it is possible to more reliably prevent the air from leaking out of the duct 52 while avoiding the duct 52 becoming large in the vehicle width direction.

According to the present embodiment, the lower edge 51b of the duct part 51 is located outward of the upper edge 51a in the vehicle width direction. With the duct part 51 having such a shape, a portion of the side cover 50 that is to be assembled onto the upper edge 51a can be located more inward in the vehicle width direction than a portion of the side cover 50 that is to be assembled onto the lower edge 51b. Therefore, it is possible to assemble the side cover 50 onto the duct part 51, thus forming a desirable duct 52, and to achieve a desirable shape with which knee gripping is easy.

According to the present embodiment, the side cover 50 includes the tank cover portion 50b placed outward of the fuel tank 30 in the vehicle width direction. There is no need, beside the side cover 50, for other covers that cover the side of the fuel tank 30. Thus, it is possible to further reduce the number of parts and to further save the fastening operation. It is also possible to increase the size of the side cover 50 and to increase the rigidity of the side cover 50.

As described above, the tank cover portion 50b of the side cover 50 is fastened to the fuel tank 30 via the bolt 74. Therefore, the side cover 50 can be supported stably.

Moreover, according to the present embodiment, the side cover 50 includes the rearward portion 50c placed outward of at least one portion of the intake pipe 49 in the vehicle width direction. There is no need, beside the side cover 50, for other covers that cover the side of the at least one portion of the intake pipe 49. Thus, it is possible to further reduce the number of parts and to further save the fastening operation. It is also possible to increase the size of the side cover 50 and to increase the rigidity of the side cover 50.

According to the present embodiment, the side cover 50, the duct part 51 and the radiator 27 are fastened together via the same bolt 71. Thus, it is possible to reduce the number of parts to be fastened together and to save the fastening operation.

According to the present embodiment, a part of the side cover 50 and a part of the lower case 42 are laid on each other in the up-down direction and are fastened together via the bolt 73. Thus, the side cover 50 can be desirably assembled onto the lower case 42.

According to the present embodiment, the side cover 50 is an injection-molded part. Injection-molded parts are aesthetically superior to blow-molded parts. When the duct 52, which is tubular, is manufactured as a single part, it is manufactured by blow molding in many cases. When the duct 52, being a single part, serves also as the side cover, a blow-molded part, which is aesthetically inferior, will be visible on the outside. According to the present embodiment, however, the side cover 50, which is an injection-molded part, serves also as a part of the duct 52, and the portion of the duct 52 that is visible on the outside is the duct formation portion 50d of the side cover 50. Thus, it is possible to improve the aesthetic appearance.

A motorcycle has been described in the embodiment described above as an example straddled vehicle. However, a straddled vehicle is not limited to a motorcycle. It may be any other straddled vehicle such as a three-wheeled vehicle and an all terrain vehicle (ATV).

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

What is claimed is:

1. A straddled vehicle comprising:
    a vehicle body frame including a head pipe and a down frame extending downward from the head pipe;
    a radiator supported on the down frame and placed below the head pipe;
    an air cleaner placed rearward of the head pipe in a vehicle front-rear direction, the air cleaner including an upper case, a lower case placed below the upper case, and an air cleaner element provided between the upper case and the lower case;
    a duct part formed integrally with the lower case and extending forward in the vehicle front-rear direction from the lower case; and a side cover including a duct formation portion located outward of the duct part in a vehicle width direction and a radiator cover portion located outward of the radiator in the vehicle width direction, wherein at least a portion of the side cover is attached to the duct part, wherein an internal space between the duct part and the duct formation portion of the side cover define a duct, and wherein the duct is connected to an internal space between the upper case and the air cleaner element in the air cleaner.

2. The straddled vehicle according to claim 1, wherein the duct part includes an upper edge extending in the vehicle front-rear direction, a lower edge extending in the vehicle front-rear direction and located below the upper edge, and an inner wall located between the upper edge and the lower edge and depressed inward in the vehicle width direction.

3. The straddled vehicle according to claim 2, wherein:
an upper portion of the duct part and an upper portion of the duct formation portion of the side cover are laid on each other in an up-down direction; and
a lower portion of the duct part and a lower portion of the duct formation portion of the side cover are laid on each other in the up-down direction.

4. The straddled vehicle according to claim 2, wherein the lower edge of the duct part is located outward of the upper edge of the duct part in the vehicle width direction.

5. The straddled vehicle according to claim 1, further comprising a fuel tank placed rearward of the air cleaner in the vehicle front-rear direction, wherein the side cover includes a tank cover portion placed outward of the fuel tank in the vehicle width direction.

6. The straddled vehicle according to claim 5, wherein the tank cover portion of the side cover and the fuel tank are fastened together via a fastener.

7. The straddled vehicle according to claim 1, comprising:
an engine unit placed rearward of, and below, the head pipe; and
an intake pipe placed below the air cleaner and connecting together the air cleaner and the engine unit,
wherein the side cover includes a portion that is placed outward of at least a portion of the intake pipe in the vehicle width direction.

8. The straddled vehicle according to claim 1, wherein the side cover, the duct part, and the radiator are fastened together via a fastener.

9. The straddled vehicle according to claim 1, wherein a portion of the side cover and a portion of the lower case are laid on each other in the up-down direction and are fastened together via a fastener.

10. The straddled vehicle according to claim 1, wherein one of the side cover and the duct part includes a groove at an upper end and a lower end, and the other of the side cover and the duct part includes a protrusion at the upper end and the lower end, the protrusion configured to fit within the groove to attach the side cover to the duct part.

* * * * *